(12) United States Patent
Lo et al.

(10) Patent No.: US 12,713,031 B2
(45) Date of Patent: Aug. 18, 2026

(54) EFFICIENT GEOMETRIC PARTITIONING MODE VIDEO CODING

(71) Applicant: MEDIATEK INC., Hsinchu City (TW)

(72) Inventors: Chih-Hsuan Lo, Hsinchu City (TW); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/858,499

(22) PCT Filed: Apr. 27, 2023

(86) PCT No.: PCT/CN2023/091279
§ 371 (c)(1),
(2) Date: Oct. 21, 2024

(87) PCT Pub. No.: WO2023/208131
PCT Pub. Date: Nov. 2, 2023

(65) Prior Publication Data

US 2025/0267278 A1 Aug. 21, 2025

Related U.S. Application Data

(60) Provisional application No. 63/336,397, filed on Apr. 29, 2022.

(51) Int. Cl.
*H04N 19/14* (2014.01)
*H04N 19/105* (2014.01)
(Continued)

(52) U.S. Cl.
CPC ........... *H04N 19/14* (2014.11); *H04N 19/105* (2014.11); *H04N 19/119* (2014.11); *H04N 19/176* (2014.11)

(58) Field of Classification Search
CPC .... H04N 19/14; H04N 19/105; H04N 19/119; H04N 19/176; H04N 19/157; H04N 19/103
See application file for complete search history.

(56) References Cited

U.S. PATENT DOCUMENTS 11,627,330 B2 4/2023 Lee
2021/0203978 A1 7/2021 Kim
(Continued)

FOREIGN PATENT DOCUMENTS

CN 110710210 A 1/2020
WO 2020005045 A1 1/2020

OTHER PUBLICATIONS

International Search Report and Written Opinion dated Sep. 5, 2023, issued in application No. PCT/CN2023/091279.

*Primary Examiner* — Nasim N Nirjhar
(74) *Attorney, Agent, or Firm* — McClure, Qualey & Rodack, LLP

(57) ABSTRACT

Various schemes for realizing efficient geometric partitioning mode (GPM) video coding are described. An apparatus receives pixel data to be coded as a current block. The apparatus further selects a partition mode from a partition mode candidate set. The apparatus further determines two merge candidates each corresponding to a respective GPM part of the current block as determined by the selected partition mode. The apparatus further excludes one or more blending width candidates from a blending width candidate set based on the selected partition mode and auxiliary data of the two merge candidates or of the current block. The apparatus further selects a blending width from the blending width candidate set after the excluding. The apparatus further code the current block using the selected partition mode, the two merge candidates and the selected blending width.

17 Claims, 13 Drawing Sheets

(51) Int. Cl.
*H04N 19/119* (2014.01)
*H04N 19/176* (2014.01)

(56) References Cited

U.S. PATENT DOCUMENTS

| | | | | |
|---|---|---|---|---|
| 2021/0211645 | A1 | 7/2021 | Lee | |
| 2021/0274162 | A1 | 9/2021 | Ahn | |
| 2023/0345023 | A1* | 10/2023 | Chen | H04N 19/44 |
| 2025/0039457 | A1* | 1/2025 | Gao | H04N 19/70 |
| 2025/0056014 | A1* | 2/2025 | Deng | H04N 19/176 |

* cited by examiner

310

320

| index | Θ | bin |
|---|---|---|
| 0 | 1/2 | 011 |
| 1 | 1 | 010 |
| 2 | 2 | 1 |
| 3 | 4 | 001 |
| 4 | 8 | 000 |

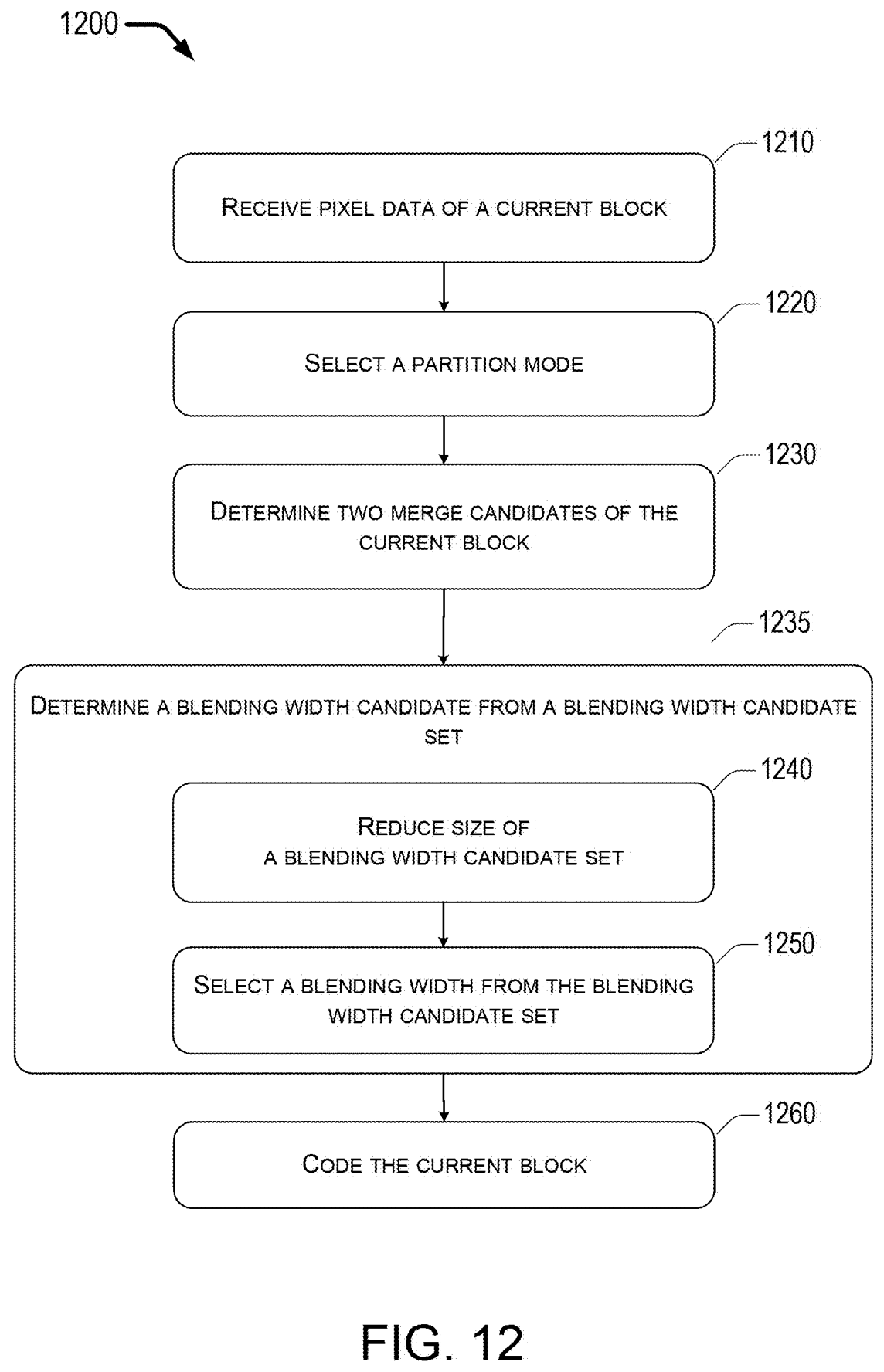

1200

1210 RECEIVE PIXEL DATA OF A CURRENT BLOCK

1220 SELECT A PARTITION MODE

1230 DETERMINE TWO MERGE CANDIDATES OF THE CURRENT BLOCK

1235 DETERMINE A BLENDING WIDTH CANDIDATE FROM A BLENDING WIDTH CANDIDATE SET

1240 REDUCE SIZE OF A BLENDING WIDTH CANDIDATE SET

1250 SELECT A BLENDING WIDTH FROM THE BLENDING WIDTH CANDIDATE SET

1260 CODE THE CURRENT BLOCK

FIG. 12

EFFICIENT GEOMETRIC PARTITIONING MODE VIDEO CODING

CROSS REFERENCE TO RELATED PATENT APPLICATION

The present disclosure is part of a non-provisional patent application claiming the priority benefit of U.S. Provisional Patent Application No. 63/336,397, filed 29 Apr. 2022, the content of which is incorporated by reference in its entirety.

TECHNICAL FIELD

The present disclosure is generally related to video coding and, more particularly, to methods and apparatus for efficiently signaling a geometric partitioning mode (GPM) within a video codec.

BACKGROUND

Unless otherwise indicated herein, approaches described in this section are not prior art to the claims listed below and are not admitted as prior art by inclusion in this section.

Video coding generally involves encoding a video (i.e., a source video) into a bitstream by an encoder, transmitting the bitstream to a decoder, and decoding the video from the bitstream by the decoder parsing and processing the bitstream to produce a reconstructed video. The video coder (i.e., the encoder and the decoder) may employ various coding modes or tools in encoding and decoding the video, with a purpose, among others, of achieving efficient video coding manifested in, for example, a high coding gain. Namely, the video coder aims to reduce a total size of the bitstream that needs to be transmitted from the encoder to the decoder while still providing the decoder enough information about the original video such that a reconstructed video that is satisfactorily faithful to the original video can be generated by the decoder.

The video is generally presented as a series of pictures, or frames, displayed in a sequence of time. Many of the coding tools are block-based coding tools, wherein a picture or a frame to be coded is divided into many non-overlapping rectangular regions called "blocks", and the video coder processes the video one block at a time in a pipeline fashion. Namely, the blocks constitute the basic elements processed by the coding tools, as often seen in intra-picture prediction and inter-picture prediction, the two main techniques used in video coding by removing spatial and temporal redundancy, respectively, in the source video. In general, the video redundancy is removed by searching for, and finding, among a plurality of already-coded blocks, one or more reference blocks that best resemble a current block to be coded. The already-coded blocks are typically stored in a reconstructed picture buffer (RPB) of the encoder as well as a decoded picture buffer (DPB) of the decoder, thus available to the encoder and the decoder for the following processes. With a reference block found, the current block can be coded or otherwise represented using the reference block itself as well as the difference between the reference block and the current block, called "residual", thereby removing the redundancy. Intra-picture prediction utilizes reference blocks found within the same picture of the current block for removing the redundancy, whereas inter-picture prediction utilizes reference blocks each found not within the same picture of the current block, but in another picture of the source video.

For inter-picture prediction, a reference block is referred to as a "predictor" of the current block (i.e., the immediate block being coded), whereas a picture that contains a reference block is referred to as a "reference picture" of the current block. A predictor is found through a motion estimation (ME) process, wherein a block having the smallest residual is determined as the predictor because it best resembles the current block. The current block is thus represented by the residual, the predictor (usually indicated by an index), as well as a motion vector (MV) representing a positional offset between the reference block and the current block, all of which are signaled (i.e., encoded into the bitstream by the encoder). On the decoder side, the bitstream is parsed to recover the residual, the index indicating the predictor and the MV, based on which the current block is subsequently reconstructed through a motion compensation (MC) process.

This inter-picture prediction technique employed by the video coder is generally referred to as motion compensation prediction (MCP). To further enhance the accuracy of the ME and MC processes, MCP may utilize fractional sample interpolation (i.e., sub-pixel interpolation), wherein the reference picture sample data may be interpolated to a sub-pixel resolution, such as half-pixel (½-pel), quarter-pixel (¼-pel) or an even finer resolution. That is, the MV may point to integer, half-sample, quarter-sample, or even finer positions in the reference picture. Moreover, the MV, rather than being directly coded, is usually differentially coded as an MV difference (MVD) from the MVs of neighboring blocks of the current block. Specifically, the MV is represented as an MV predictor (MVP) plus the MVD, wherein the MVP may be one of the MVs of neighboring blocks, or may be derived from a combination of several MVs of neighboring blocks. That is, the MVP is correlated with the MVs of the neighboring blocks, and the correlation may be indicated by an index. Encoding the combination of the MVD and the MVP rather than the MV itself may further reduce the bitstream size. The MV (or equally the MVD and the MVP) is often referred to as "motion data" or "motion information" of the current block. To code the current block, the encoder entropy-encodes the reference ID (i.e., the index indicating the reference block), the residual (after transformation and quantization), and the motion information into the bitstream, whereas the decoder parses (i.e., entropy-decodes) the bitstream to recover the reference ID, the motion information and the residual, thereby reconstructing the current block.

Various techniques demonstrated in the present disclosure may be employed to enhance the efficiency and performance of MCP, especially for blocks containing object boundaries that are not substantially parallel with the sides of the blocks. The techniques herein may be applied to, and thus expand or enhance the capability of, codecs compliant with contemporary video coding standards such as High-Efficiency Video Coding (HEVC) or Versatile Video Coding (VVC). HEVC is an international video coding standard developed by the Joint Collaborative Team on Video Coding (JCT-VC). HEVC is based on the hybrid block-based motion-compensated DCT-like transform coding architecture. (DCT stands for discrete cosine transform.) The basic unit for compression, termed coding unit (CU), is a 2N×2N square block of pixels, and each CU can be recursively split into four smaller CUs until the predefined minimum size is reached. Each CU contains one or multiple prediction units (PUs). VVC is a codec designed to meet upcoming needs in videoconferencing, over-the-top streaming, mobile telephony, etc. VVC is meant to be very versatile and address all the video needs from low resolution and low bitrates to high resolution and high bitrates, high dynamic range (HDR), 360 omnidirectional, etc. VVC supports YCbCr color spaces with 4:2:0 sampling, 10 bits per component, YCbCr/RGB 4:4:4 and YCbCr 4:2:2, with bit depths up to 16 bits per component, with HDR and wide-gamut color, along with auxiliary channels for transparency, depth, and more.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to efficient GPM video coding. It is believed that with the various embodiments in the present disclosure, benefits including enhanced coding gain, lower signaling overhead, and/or reduced hardware cost are achieved.

In one aspect, a method is presented for performing an efficient GPM coding by applying candidate set size reduction and/or candidate reordering. The method may involve receiving pixel data of the current block, as well as pixel data of one or more neighboring blocks of the current block. In some embodiments, the one or more neighboring blocks may include a neighboring block immediately above the current block and/or a neighboring block immediately left to the current block. The method may also involve selecting a partition mode from a partition mode candidate set. The partition mode candidate set may include one or more partition mode candidates, whereas each partition mode candidate is defined or otherwise characterized by a respective partitioning boundary within the current block. In some embodiments, a partitioning boundary may be a straight line that splits the current block into two parts called "GPM parts". The straight split line may be defined by an angle parameter and an offset parameter. The method may also involve determining two merge candidates of the current block, wherein each merge candidate is a reference block in a reference picture and corresponds to a respective one of the two GPM parts. The two merge candidates may be selected from a merge candidate set having two or more merge candidates. The two merge candidates may not be the same reference block. The method may also involve determining a blending width from a blending width candidate set based on the selected partition mode and auxiliary data of the two merge candidates or of the current block. The step of determining the blending width may also involve performing a size reduction to a blending width candidate set that includes two or more blending width candidates. Namely, the codec may exclude one or more blending width candidates from the blending width candidate set. A blending width determines the blending strength by which the two merge candidates are blended into one GPM prediction. The codec may do so, i.e., exclude some blending width candidate(s), based on the selected partition mode, auxiliary data of the two merge candidates, and/or auxiliary data of the current block. The auxiliary data may include MVs of the current block, MVs of one or more neighboring blocks to the current block, sample values of the two GPM parts, indices of the two merge candidates, sample values of a template region adjacent to the current block, and/or sample values of a template region adjacent to one of the two merge candidates. The step of determining the blending width may also involve selecting a blending width from the sized-down blending width candidate set, i.e., after the excluding of the one or more blending width candidates. Finally, the method may also involve coding the current block using the selected partition mode, the two merge candidates as determined, and the selected blending width.

In some embodiments, the step of determining the blending width may further involve reordering the already-sized-down blending width candidate set before selecting the blending width. The reordering is based on some guess cost calculations which are much less computation intensive than the actual rate-distortion (RD) cost calculations. Specifically, for each blending width candidate that remains in the blending width candidate set, a respective guess cost of an associated GPM prediction is calculated. The guess cost calculation may employ template matching and/or boundary matching techniques.

In some embodiments, the method may additionally include constructing a GPM candidate set that has a number of number of GPM candidates, whereas each of the GPM candidates represents a respective combination of one of the partition mode candidates and one of the merge candidates. In some embodiments, the GPM candidate set may also be reordered based on the guess cost calculation approach.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 12 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to efficient GPM coding including signaling schemes between the encoder and the decoder of a video codec. According to the present disclosure, a number of possible solutions may be implemented separately or jointly. That is, although these possible solutions may be described below separately, two or more of these possible solutions may be implemented in one combination or another.

I. Motion Compensation Prediction Using Merge Mode

As described elsewhere herein above, with MCP applied to a current block, the motion information of the current block is coded in the bitstream. Nevertheless, a so-called "merge mode" may be employed to increase the MV coding efficiency of MCP, wherein the motion information is inherited or otherwise obtained from spatially neighboring blocks (spatial candidates) or a temporal co-located block (temporal candidate). That is, under the merge mode, no motion information is coded. Rather, a candidate index is selected and signaled to indicate which candidate among a merge candidate set is used for merging, wherein the merge candidate set comprises a list of merge candidates including the spatial candidate(s), the temporal candidate, and some additional/derived candidate(s). The current block, which may be a PU, thus reuses the MV, prediction direction, and reference picture index of the selected candidate. A plurality of PUs may refer to a same candidate under the merge mode, and each of the plurality of PUs, called merged PUs, thus inherits the same MV, prediction direction, and reference picture index from the candidate.

A special case of the merge mode is called "skip mode", wherein the residual of a current block is inferred to be zero and not coded (i.e., not signaled).

Figure 1:
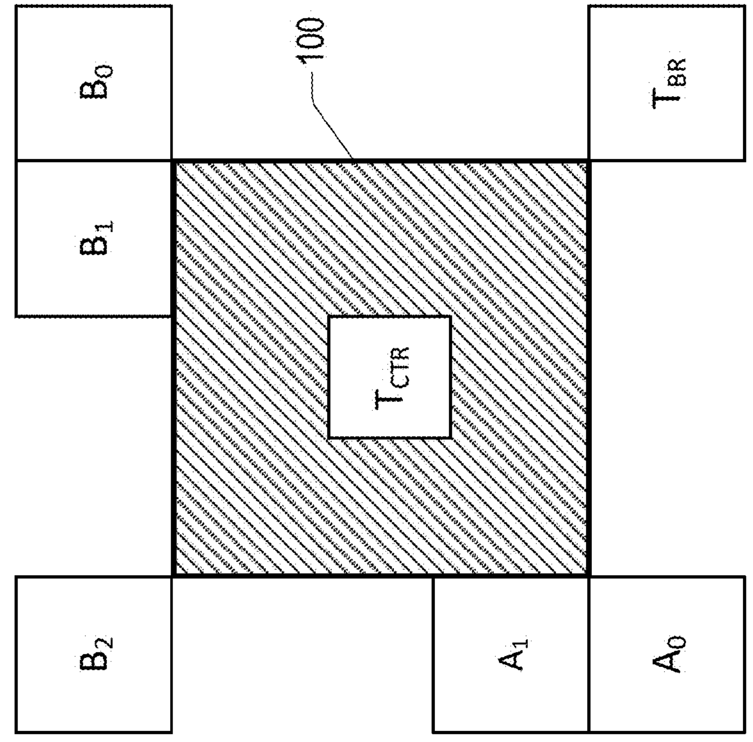
FIG. 1 is a diagram of an example design in accordance with an implementation of the present disclosure.

FIG. 1 is a diagram of an example design in accordance with an implementation of the present disclosure, wherein several motion candidates of the merge mode are illustrated. Each of the motion candidates may be a candidate in the merge candidate set. Specifically, a current block 100 of a video picture or frame is being encoded or decoded by a video codec. As illustrated, among the motion candidates, up to four spatial MV candidates are derived from spatial neighbors $A_0$, $A_1$, $B_0$ and $B_1$, and one temporal MV candidate is derived from $T_{BR}$ or $T_{CTR}$, wherein $T_{BR}$ represents the bottom right neighbor of a temporally co-located block of the current block 100, and $T_{CTR}$ represents the center block of the temporally co-located block. $T_{BR}$ is used as a candidate if it is available, whereas $T_{CTR}$ is used instead if $T_{BR}$ is not available. If any of the four spatial MV candidates is not available, position $B_2$ is then used to derive an MV candidate as a replacement. In some embodiments, after the derivation process of the four spatial MV candidates and the one temporal MV candidate, a "pruning" operation, essentially a redundancy check, is performed to remove any redundant MV candidate(s). After the redundancy check, if the number of available MV candidates is smaller than a predefined number, e.g., five, three types of additional candidates may be derived and subsequently added to the merge candidate set. The encoder of the video codec may select one final candidate from the merge candidate set for coding the current block 100 in merge mode. For example, the encoder may select a candidate using a rate-distortion optimization (RDO) decision. That is, the encoder calculates an RD cost of the current block as predicted by each candidate in the merge candidate set. The candidate having the lowest RD cost is then selected as the final candidate with which the current block is coded. Accordingly, the encoder transmits or otherwise signals an index indicating the final candidate to a decoder of the video codec.

II. Geometric Partitioning Mode

The merge mode as described above, hereinafter referred to as "regular merge mode", aims to improve the MV coding efficiency by not explicitly signaling the MCP motion information but having the current block inherit the motion information of the selected merge candidate. The regular merge mode works well for blocks that do not include an object boundary or blocks that include an object boundary that is substantially parallel to a side of the current block (i.e., substantially vertical or horizontal). However, for video containing a natural object moving against a background or relative to other moving objects, often a boundary of the natural object is neither vertical nor horizontal, but oblique with respect to the sides of a current block. The regular merge mode may not predict such a block very well due to the obliqueness, resulting in a sub-optimal coding gain.

To address the boundary obliqueness and thus improve the coding gain, a special merge mode called geometric partitioning mode (GPM) may be used in place of the regular merge mode. The GPM aims to provide flexible CU partitioning to track an object boundary more closely by splitting the current block into two parts along the partitioning boundary. In some embodiments, the partitioning boundary may be a straight split line that better aligns with an oblique object boundary of the CU (i.e., the current block) than a horizontal or vertical PU edge does. The GPM generally results in a better MCP than the regular merge mode. The split line is hereinafter interchangeably referred to as the partitioning boundary, and the two parts of the CU that are separated by the partitioning boundary are referred to as the two GPM parts of the CU. Each of the two GPM parts is respectively inter-predicted using its own motion information and coded with regular merge mode. Moreover, only unidirectional MCP is allowed for the GPM parts. That is, only one motion vector and one reference index are allowed for each of the two GPM parts. The unidirectional prediction motion constraint is applied to ensure a memory bandwidth same as that of the conventional bi-directional prediction. Namely, only two motion compensated predictions (MCPs) are performed for each CU under GPM. The two MCPs, each predicted using a respective GPM part, are then blended through a blending operation into a GPM prediction, which is then subtracted from the original samples of the current block to generate residual.

Figure 2:
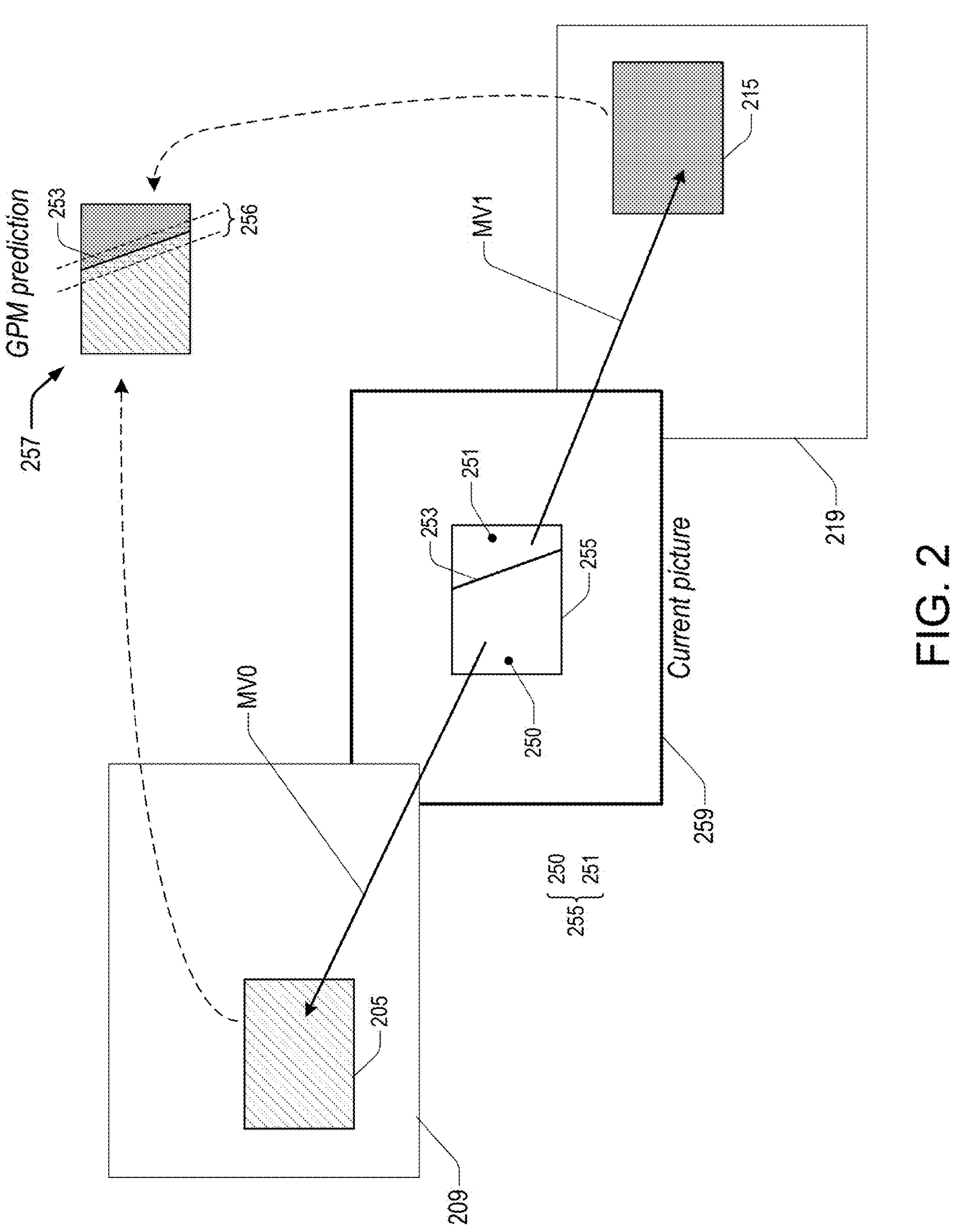
FIG. 2 is a diagram of an example design in accordance with an implementation of the present disclosure.

An example of the GPM as described above is illustrated in FIG. 2, wherein a current block 255 of a current picture 259 is coded using the GPM. As illustrated, the current block 255 is split into two parts 250 and 251 along a split line 253, which is a straight line across the current block 255. The split line 253 may be substantially aligned with an object boundary contained in the current block 255. Moreover, the split line 253 is oblique with respect to the sides of the current block 255. The video codec performs unidirectional MCP for each of the parts 250 and 251, resulting in the part 250 being inter-predicted by MV0 from a reference block 205 of a reference picture 209, and the part 251 being inter-predicted by MV1 from a reference block 215 of another reference picture 219. That is, the parts 250 and 251 are respectively inter-predicted in regular merge mode, which results in merge candidates 205 and 215. (The reference blocks 205 and 215 are hereinafter interchangeably referred to as merge candidates 205 and 215.) Subsequently, the video codec performs a blending operation to form a GPM prediction 257 based on the merge candidates 205 and 215. The GPM prediction 257 has the same size (i.e., width and height) as the current block 255, as well as each of the merge candidates 205 and 215. The blending operation is performed for pixel samples within a blending region 256 along or in a vicinity of the partitioning boundary 253. That is, the blending operation blends the merge candidates 205 and 215 into the GPM prediction 257 by adjusting sample values of the reference block 205 and/or the reference block 215 within the blending region 256. For instance, a sample within the blending region 256 of the GPM prediction 257 may be a weighted average of one or more samples of the reference block 205 and one or more samples of the reference block 215. The GPM prediction 257 is then subtracted from the current block 255 to generate a residual of the current block 255, and the residual is then transformed and quantized before being coded into a bitstream.

It is to be noted that an adaptive weighting, rather than a fixed weighting, may be applied in the blending process. For example, in forming a first sample in the blending region 256 of the GPM prediction 257, the blending weights of the samples of the reference blocks 205 and 215 may be different from the blending weights used in forming a second sample in the blending region 256 of the GPM prediction 257. More details are given elsewhere hereinbelow regarding the adaptive blending features of the present disclosure.

The GPM may support many different partition modes, with each partition mode defined by a respective partitioning boundary. For instance, the GPM is capable of splitting the current block 255 along one of many different partitioning boundaries, thereby forming different pairs of the GPM parts 250 and 251. For straight-line partitioning boundaries, each partitioning boundary is defined or otherwise specified by an angle parameter and an offset parameter. The video encoder may determine or otherwise select a specific one of the many different partition modes to encode the current block in the GPM mode. For example, the encoder may perform an RDO search within the partition mode candidate set, i.e., perform an RDO operation for the partition mode candidates in the partition mode candidate set by calculating a respective RD cost for each partition mode candidate, and then designate the partition mode having the lowest RD cost as the selected partition mode with which the CU is to be coded. After the partition mode is selected, an index indicating the selected partition mode may be signaled to the decoder, along with two merge indices each indicating a reference block of one of the two parts resulted from applying the selected partition mode to the current block.

Figure 3:
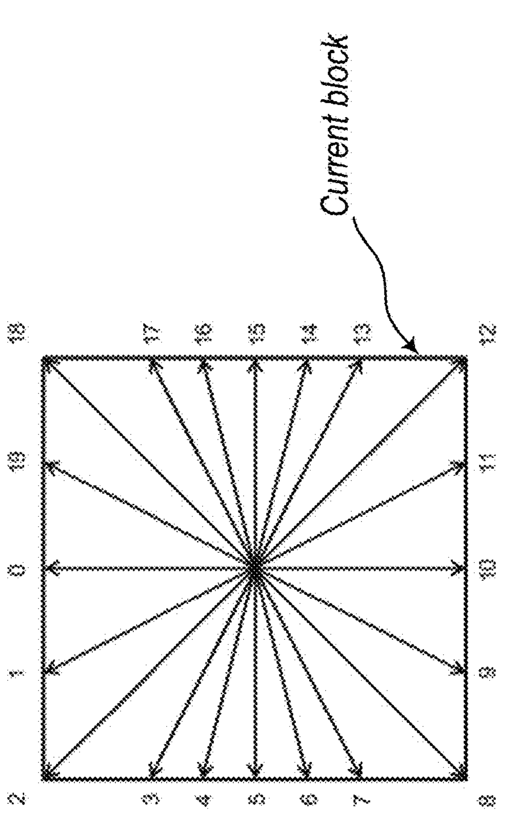
FIG. 3 is a diagram of an example design in accordance with an implementation of the present disclosure.
Figure 3:
Figure 3:
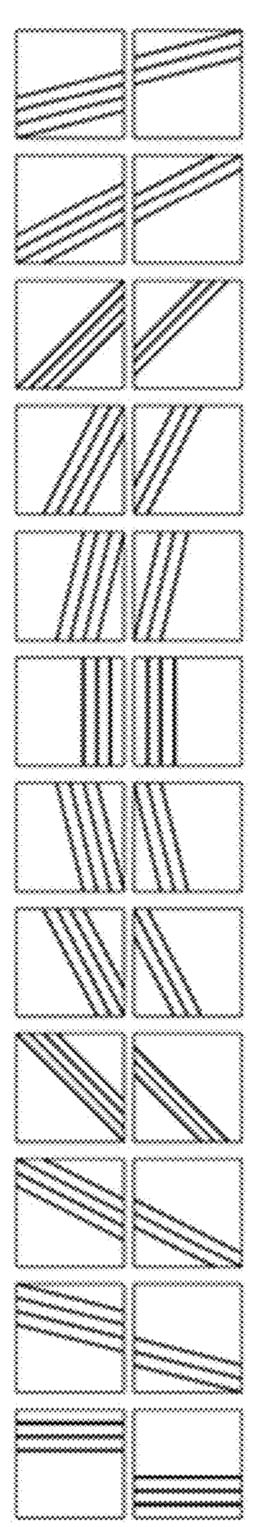

For a specific partition mode, the location of the corresponding split line within the current block is mathematically derived from the angle parameter and the offset parameter to some degrees similar to how a straight line is defined on an x-y plane using a slope and an intercept. FIG. 3 is a diagram of an example design in accordance with an implementation of the present disclosure, wherein various split lines of the GPM are shown. Specifically, in diagram 310, twenty different angles in the range of $[0,2\pi)$ (i.e., 0-360 degrees) are shown, which the GPM may support. The angle of a partition mode is defined by the angle parameter. A split line with zero offset represents a partition mode having a partitioning boundary going through the center location of the current block. Some partition modes may have a non-zero offset. That is, a split line passing the center location of the current block may be parallelly shifted by an offset, which is specified by the offset parameter, resulting in a different partition mode of the current block, although the angle parameter remains the same value. Shown in diagram 320 are groups of parallel split lines having a same value of the angle parameter and different values of the offset, wherein each split represents a GPM partition mode. As shown, each group comprises up to four different GPM partition modes that are parallel with each other.

The GPM, as one kind of merge mode, is signaled using a CU-level flag. A test model of the VVC standard has a GPM that supports up to sixty-four different partition modes for each possible CU size $w \times h = 2^m \times 2^n$, with $m, n \in \{3, \ldots, 6\}$, excluding sizes of 8×64 and 64×8. To signal a GPM partition mode out of the sixty-four possible partition mode candidates, as many as 6 bits are needed for signaling an index indicating the selected GPM partition mode. In some embodiments, the video codec may refrain from coding a slender CU using GPM, such as blocks having an aspect ratio larger than N to 1 or smaller than 1 to N, whereas N is an integer threshold (e.g., 4, 6, 8 or 10). Similar to the regular merge mode, the GPM may have a skip mode as a special case, wherein the residual of a current block is inferred to be zero and not coded (i.e., not signaled).

III. GPM Blending Width

Figure 4:
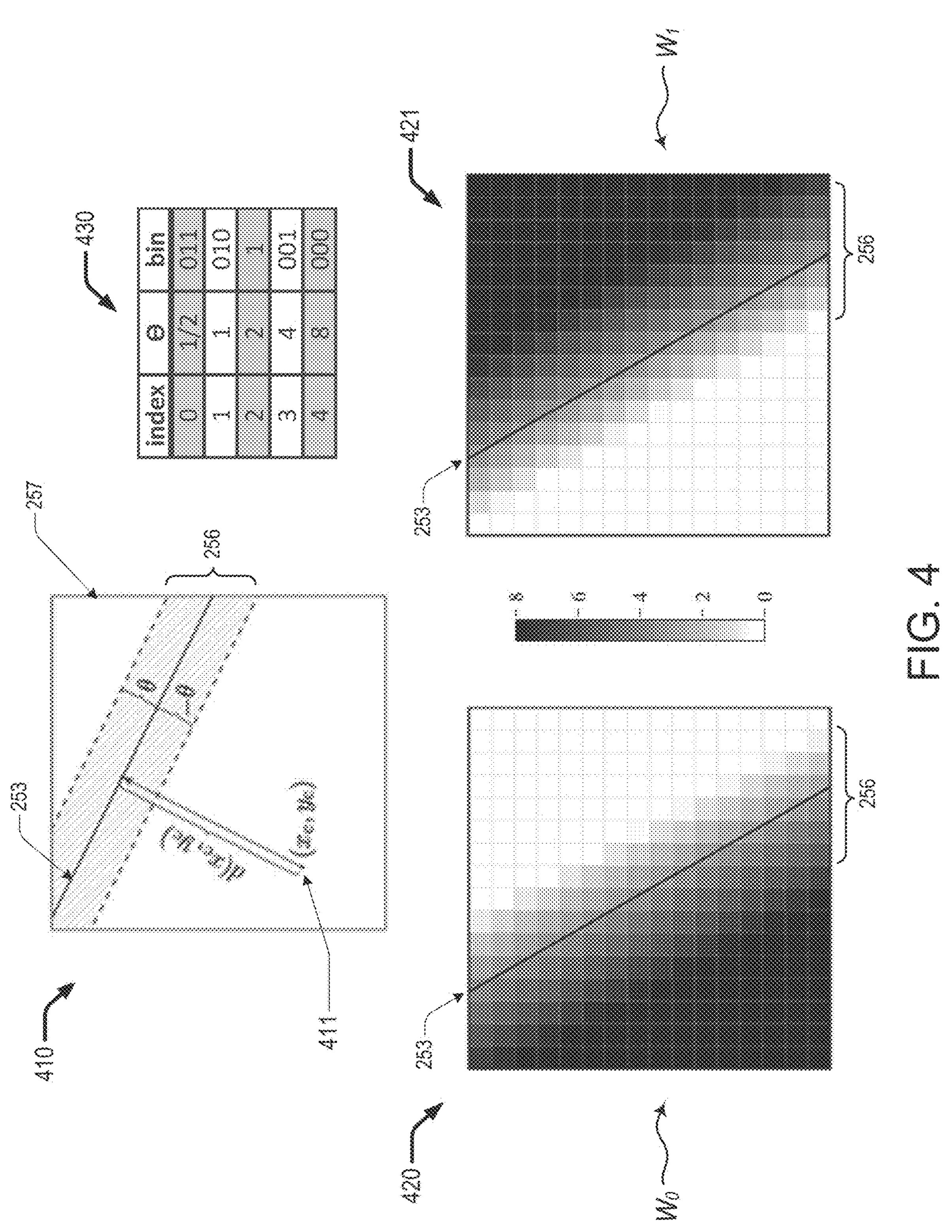
FIG. 4 is a diagram of an example design in accordance with an implementation of the present disclosure.

As described elsewhere herein above, a blending process is performed to blend the two merge candidates (e.g., reference blocks 205 and 215) into a GPM prediction (e.g., the GPM prediction 257). In general, the blending region wherein sample values may be adjusted by the blending process, such as the blending region 256, comprises a stripe having a width of 2θ along the split line (e.g., the split line 253), with the split line located along the center line of the stripe. That is, in the direction perpendicular to the split line, the blending region has a dimension of 2θ, with 1θ on one side of the split line and 1θ on the other side of the split line, as exemplified in diagram 410 of FIG. 4. The parameter θ is referred to as the blending width parameter of the blending operation for GPM, hereinafter interchangeably referred to as "blending width".

The blending operation involves two integer blending matrices, $W_0$ and $W_1$, which are illustrated in diagrams 420 and 421, respectively. The weights in the GPM blending matrices $W_0$ and $W_1$ contain values from a predefined range that is set by two threshold values, such as [0, 8], and are derived based on a displacement from a sample position (e.g., position 411) to the GPM partitioning boundary (e.g., the split line 253 of diagram 410). As shown in diagram 410, the sample position 411 is denoted as $(x_c, y_c)$, and the displacement is denoted as $d(x_c, y_c)$. The displacement may be calculated as a quantized distance from the sample position 411 to the GPM partitioning boundary 253.

The blending matrices $W_0$ and $W_1$ are sometimes referred to as "blending masks", whereas each value therein represents the "blending strength" of the corresponding sample of the merge candidate 205 or 215 in forming the GPM prediction 257. Thus, each of the blending matrices $W_0$ and $W_1$ has the same size (i.e., width w and height h) as the current block 255 (as well as the merge candidates 205 and 215). In some embodiments, the weights are given by a discrete ramp function parameterized by the displacement and two threshold values. For example, the two thresholds may be 0 and 8, and the weighting values in one of the blending masks $W_0$ and $W_1$ may be given by a ramp function as follows:

$$\omega_{x_c,y_c} = \begin{cases} 0 & d(x_c, y_c) \le -\theta \\ \frac{8}{2\theta}(d(x_c, y_c)+\theta) & -\theta < d(x_c, y_c) < \theta \\ 8 & d(x_c, y_c) \ge \theta, \end{cases} \quad \text{(Eq. 1)}$$

The weighting values of the other blending mask may be readily calculated based on the following relation:

$$W_0 + W_1 = 8 * J_{w,h}, \quad \text{(Eq. 2)}$$

wherein $J_{w,h}$ is a matrix of ones with a size of w×h. Consequently, the GPM prediction 257 is calculated as $$P_G = (W_0 \circ P_0 + W_1 \circ P_1 + 4) \gg 3 \quad \text{(Eq. 3)}$$

wherein $P_0$ represents the merge candidate 205, $P_1$ represents the merge candidate 215, and PG represents the GPM prediction 257.

In some embodiments, the blending width θ for any GPM-coded CU is a fixed value regardless which partition mode is used. For example, θ may be defined as a fixed value of 2 pel. With a fixed θ=2 pel, the ramp function of Eq. 1 can be quantized as $$\omega_{x_c,y_c} = \text{Clip3}(0, 8, (d(x_c, y_c) + 32 + 4) \gg 3) \quad \text{(Eq. 4)}$$

A fixed value of θ, however, may not be optimal for all CUs. That is, depending on the content of a CU, the fixed value of θ may be too large or too small for achieving an optimal blending.

In some embodiments, the value of the blending width θ may be selected from a predefined set of values, the set of values being referred to as a "blending width candidate set". For example, the video coder may select the blending width θ from a blending width candidate set comprising the following predefined candidates: ½ pel, 1 pel, 2 pel, 4 pel and 8 pel. Namely, θ∈{½, 1, 2, 4, 8}, as shown in diagram 430. In general, the number of candidates in a candidate set is referred to as the "size" of the candidate set. Accordingly, the blending width candidate set wherein θ∈{½, 1, 2, 4, 8} has a size of five, as there are five candidates in the candidate set. Moreover, each candidate in the blending width candidate set may be indicated or otherwise represented by an index, and in some embodiments the index of the selected blending width may be signaled from the encoder to the decoder. It may require as many as 3 bits to signal an index indicating the θ selected from a blending width candidate set having five candidates. To select the blending width θ from the blending width candidate set for GPM coding, the codec may perform an RDO search within the blending width candidate set, i.e., perform an RDO operation for the blending width candidates in the blending width candidate set. For example, for each the blending width candidate in the blending width candidate set, a respective GPM prediction 257 is generated by blending the two merge candidates 205 and 215 using the respective blending width candidate. Subsequently, a respective RD cost is calculated between the generated GPM prediction 257 and the current block 255. The blending width candidate resulting in the lowest RD cost is then designated as the selected blending width with which the current block 255 is coded. Generally speaking, if the two GPM parts are quite different from one another, a small value of θ tends to result in a lower RD cost than a large value of θ and is thus preferred. On the other hand, if a gradient across the partitioning boundary is rather small, a larger value of θ is often preferred.

IV. GPM Signaling

To signal a GPM-coded CU, several syntax elements may be signaled from the encoder to the decoder. The syntax elements may include: (1) two merge candidate indices indicating the two merging candidates (e.g., the merge candidates 205 and 215); (2) a partition mode index indicating the selected partition mode (e.g., the split line 253) out of a partition mode candidate set having a plurality of partition mode candidates (e.g., the various partition modes shown in diagram 320); and (3) a blending width index indicating the selected blending width θ out of a blending width candidate set having a plurality of blending width candidates (e.g., θ∈{½, 1, 2, 4, 8} as shown in diagram 430). As described elsewhere herein above, in an event that the partition mode candidate set has 64 partition mode candidates, as many as 6 bits are required to signal the selected partition mode using fixed-length binary coding. Likewise, in an event that the blending width candidate set has five blending width candidates, as many as 3 bits are required to signal the selected partition blending width. Additionally, the two merge candidate indices may be coded using a truncated unary (TU) binarization scheme and demand a total of 9 bits to signal. Apparently, the many bits (i.e., 9+6+3=18 bits) required for signaling a GPM-coded CU are sub-optimal as the many bits required negatively affect the coding gain of the video codec.

The employment of variable-length binary coding for the indices may help reduce the signaling overhead as compared to a fixed-length coding scheme. For instance, diagram 430 lists corresponding binary code words (in the "bin" column) used for signaling the θ candidates using a variable-length coding scheme. As shown, the 1-bit code word "1" is assigned to θ=2, whereas each of the other four θ candidates is coded with a respective three-bit code word. Since the θ=2 candidate is the most often selected blending width for GPM-coded CUs in a video, the corresponding short code word for signaling the blending width θ=2 helps to enhance the overall coding gain. In some embodiments, for a GPM-coded CU, the video codec may determine the selected partition mode and the selected blending width θ by performing an RDO search operation that demands calculating an RD cost for every possible combination of a partition mode and a blending width. For example, with 64 candidates in the partition mode candidate set and 5 candidates in the blending width candidate set, the encoder of the video codec would perform RDO search across the 64×5=320 possible partition-θ combinations for the current CU. The encoder may determine or otherwise designate the combination having the lowest RD cost as the pair of the selected partition and the selected blending width. Apparently, the RDO across all partition-θ combinations is a very computation-intensive task for the encoder.

Various techniques, as detailed below, may be employed for GPM to reduce the calculation burden of the encoder, as well as signaling overhead, thereby enhancing coding efficiency without compromising much, if any, of the coding gain.

V. Candidate Set Size Reduction

In one aspect, the present disclosure proposes increasing the overall coding efficiency by reducing the size of the blending width candidate set, i.e., by excluding from the predefined blending width candidates one or more candidates that are less likely to result in a satisfactory coding gain. The method of candidate set size reduction has three stages or steps: (i) detecting or otherwise determining an object edge within each of the two GPM merge candidates; (ii) calculating a gradient of the current block based on gradients across the detected object edges of the two GPM merge candidates; and (iii) excluding one or more unlikely candidates based on the calculated gradient of the current block. The first and second steps are performed using sample values and/or auxiliary data of the two merge candidates resulted from the selected partition mode (e.g., the reference blocks 205 and 215). The third step is performed using a statistical model or a look-up table (LUT), which may be history-based. That is, based on the calculated gradient and the statistical model/LUT, the video codec may exclude from the blending width candidate set one or more blending width candidates that are less likely to be used for GPM-coding the current block, thereby reducing the size of the blending width candidate set. In the encoder side, after the candidate size reduction, an RDO search or calculating based on auxiliary data of the two merge candidates or of the current block or of the current block may be performed within the sized-down candidate set instead of the pre-defined, full-size candidate set to select the final candidate of blending width to be used to GPM-code the current block.

Figure 5:
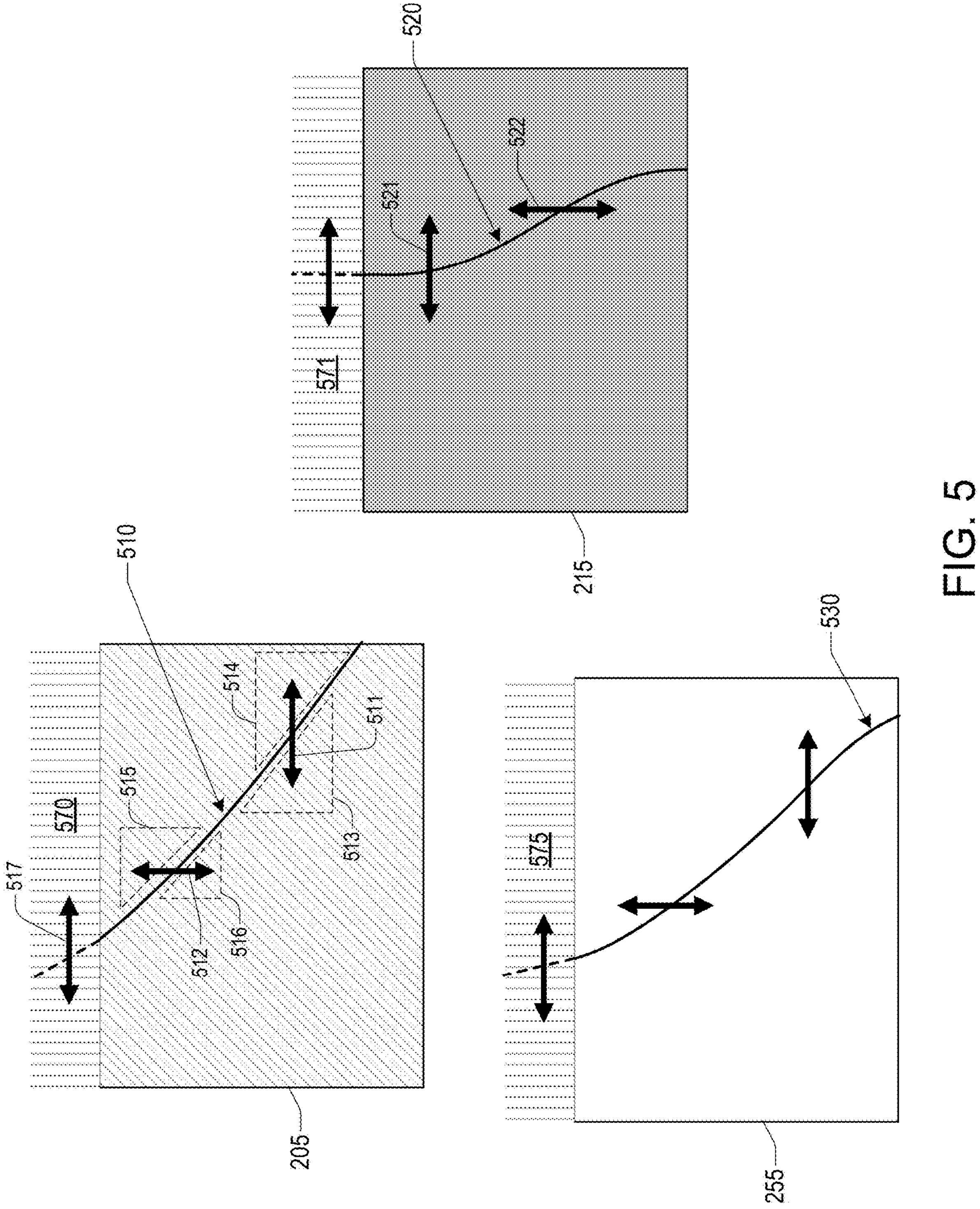
FIG. 5 is a diagram of an example design in accordance with an implementation of the present disclosure.

FIG. 5 is a diagram of an example design in accordance with an implementation of the present disclosure, wherein edge detection is performed on the reference blocks 205 and 255 to detect object edges 510 and 520, respectively. Typical edge detection algorithms may be employed for this task. For example, an abrupt change or discontinuity in sample intensity within a block may be detected as an object edge. The most prominent discontinuity (i.e., the most abrupt change) detected within the reference block 205 or 255 may be designated as the object edge 510 or 520. In some embodiments, samples in a "template" region, which is part of the auxiliary data as described elsewhere herein below, may also be used for the edge detection. A template of a block refers to a region that is adjacent to the block that contains a few rows and/or columns of samples of neighboring block(s) that have been reconstructed using intra prediction, either with or without position dependent intra prediction combination (PDPC). A more detailed illustration of a template is given elsewhere herein below. As illustrated in FIG. 5, the reference block 205 has a template 570 that includes a few rows of a neighboring block that are immediately above the block 205. Likewise, the reference block 215 has a template 571 that includes a few rows of a neighboring block that are immediately above the block 215. In an event that the template samples (i.e., samples in the templates 570 and 571) are available to the codec (e.g., still stored in a reconstructed picture buffer of the encoder or a decoded picture buffer of the decoder) when the current block 255 is being coded, the template samples may also be used in conjunction with, or in place of, the samples within the reference blocks 205 and 215, respectively, for the edge detection of step (i).

In step (ii), a gradient across each of the detected object edges 510 and 520 may be calculated based on sample values of the respective reference block or some auxiliary data thereof (e.g., the samples in the template 570 or 571). For example, the gradient may be calculated using average sample values within certain regions on both sides of the object edge 510 or 520. For instance, the gradient across the object edge 510 may be represented by a first gradient value 511, which is calculated as a difference between average sample values within regions 513 and 514 of the block 205, wherein the regions 513 and 514 are two areas substantially located horizontally with respect to one another and in a vicinity of the object edge 510. Alternatively, the gradient across the object edge 510 may be represented by a second gradient value 512, which is calculated as a difference between average sample values within regions 515 and 516 of the block 205, wherein the regions 515 and 516 are two areas substantially located vertically with respect to one another and in a vicinity of the object edge 510. Similarly, the gradient across the object edge 520 may be calculated as a horizontal gradient value 521 or a vertical gradient value 522, whereas the gradient values 521 and 522 are calculated in a similar way as the gradient values 511 and 512, respectively. In some embodiments, the gradient across the object edge 510 may be calculated by combining the first and second gradient values 511 and 512, e.g., as a weighted average thereof. Likewise, the gradient across the object edge 520 may be calculated by combining the gradient values 521 and 522 as a weighted average. The weighting of calculate the weighted averages may be dependent on the obliqueness of the object edges 510 and 520, respectively. For example, the object edge 510 is angled substantially diagonal within the block 205, and thus the weights of the gradient values 511 and 512 may be substantially the same in calculating the weighted average. As another example, the object edge 520 is angled more vertical within the block 215, and thus the gradient values 522 may have a higher weighting than that of the gradient value 521 in calculating the weighted average.

In some embodiments, samples in the templates 570 and 571 may be used additionally or alternatively for calculating the gradient across the object edges 510 and 520, respectively. For example, a horizontal gradient 517 calculated using sample values in the template 570 may be used in place of the horizontal gradient 511 in calculating the gradient across the object edge 510. Alternatively, the horizontal gradient 517 may be directly designated as the gradient across the object edge 510. When calculating the gradient using sample values in the templates 570 and 571, the object edges 510 and 520 may be extrapolated or otherwise extended through the vertical dimension of the templates 570 and 571, respectively.

Further in step (ii), a gradient of the current block 255 may be determined based on the gradient across the object edge 510 and the gradient across the object edge 520. In some embodiments, the larger of the two gradients may be designated as the gradient of the current block 255. In some embodiments, a weighted average of the two gradients may be computed and designated as the gradient of the current block 255. For instance, the two gradients may be weighted according to a first index difference between the reference block 205 and the current block 255, as well as s second index difference between the reference block 215 and the current block 255. Each of the first and second index differences may be an indication of the difference of the respective reference block 205 or 215 and the current block 255 in picture order count (POC). The weighting may be inversely proportional to the first and second index differences.

In step (iii) of blending width candidate set size reduction, one or more less likely candidates are excluded from the candidate set based on the gradient of the current block 255 as calculated in step (ii). In general, a larger gradient demands a smaller GPM blending width θ to achieve a higher coding gain, whereas a smaller gradient works better with a larger value of θ. For example, for a predefined blending width candidate set that has five candidates, e.g., $\theta \in \{1/2, 1, 2, 4, 8\}$ as shown in diagram 430, in an event that step (ii) results in a large value of gradient across the object edge, the video codec may exclude θ=4 and θ=8 from the blending width candidate set, leaving only $\theta \in \{1/2, 1, 2\}$ as the sized-down candidate set. On the other hand, in an event that step (ii) results in a rather small gradient value, the video codec may exclude θ=½ and θ=1 from the blending width candidate set, leaving only $\theta \in \{2, 4, 8\}$ as the sized-down candidate set. The sized-down candidate set enables a shorter code word for signaling the selected blending width. For instance, the code word may reduce from 3 bits to 2 bits as the size of the candidate set is reduced from five to three. The sized-down candidate set also alleviates the RDO burden of the codec, resulting in higher coding efficiency.

As mentioned elsewhere herein above, the relationship between the gradient value of the current block as calculated in step (ii) and the excluded candidate(s) in step (iii) may be established by a statistical model, which may be a LUT. In some embodiments, the statistical model/LUT may be history-based. That is, the codec may determine which blending width candidate or candidates are to be excluded in step (iii) based on results of previous RDO operations based on the full-fledged candidate set. For example, before the model/LUT is established, the codec may skip step (iii) and perform RDO search across every predefined candidate in the blending width candidate set. As the codec codes more and more CUs in GPM, based on the results of the exhausted RDO search in coding the CUS, the codec may establish and refine the statistical model or the LUT to have an educated guess of the likelihood of certain blending width candidates with respect to certain gradient values. Once the LUT is available, the codec may perform step (iii) using the LUT to exclude one or more unlikely candidates based on the gradient value of the current block as calculated in step (ii). In some embodiments, the LUT may be depleted and established anew when the codec starts to code a new slice, when a scene change is detected, or when there is a transition between a natural image (NI) and a screen content image (SCI) in the source video.

In some embodiments, the codec may exclude one or more candidates from the blending width candidate in step (iii). In some embodiments, the codec may exclude all but one candidate from the predefined blending width candidate set such that the blending width candidate set has only one blending width candidate after step (iii). In an event that only one candidate is left in the blending width candidate set, the only candidate is automatically selected without RDO, and there is no need to signal the selected blending width from the encoder to the decoder since it is already implicitly determined on the decoder side.

In some embodiments, the candidate set size reduction method as presented above may be modified slightly, wherein step (i) is modified to: (i-a) detecting or otherwise determining an object edge within the current block, step (ii) is modified to: (ii-a) calculating a gradient across the determined object edge for the current block, while step (iii) remains the same. The modified method is further described below.

In step (i-a), an object edge within the current block is determined. In some embodiments, the partitioning boundary of the selected partition mode for the current block 255, e.g., the partitioning boundary 253, may be designated as the object edge within the current block. In some embodiments, the object edge within the current block may be derived from the object edges detected within the two GPM merge candidates in step (i). Referring to FIG. 5, an object edge 530 within the current block 255 may be derived from the object edge 510 detected in the merge candidate 205 and the object edge 520 detected in the merge candidate 215. For instance, the object edges 510 and 520 may be weight-averaged to generate the object edge 530. In some embodiments, the weighting may be inversely proportional to the aforementioned first and second index differences, i.e., the index difference between the reference block 205 and the current block 255 as well as the index difference between the reference block 215 and the current block 255.

In step (ii-a), the gradient across the object edge for the current block as determined in step (i-a) may be calculated in a similar way as the gradient cross the object edge 510 or 520 is calculated in step (ii) as described above. In some embodiments, other auxiliary data may be used additionally or alternatively to calculate the gradient across the object edge 510, 520 or 530 in step (ii) and step (ii-a), whereas the basic principle for calculating the gradient remains the same as abovementioned. The auxiliary data may include MVs in the current CU, MVs of neighboring blocks or subblocks (e.g., one or more neighboring blocks to the current CU) or the difference between the neighboring MVs, the difference of the MVs between the current CU and the neighboring blocks, the reference sample values or the reference indices of the two GPM parts (e.g., sample values or indices of the reference blocks 205 and 215) or the differences thereof, the prediction modes or types of the two GPM parts, dimension (e.g., width, height, area and/or aspect ratio) of the current block, or a combination of two or more items as listed above. That is, in addition to, or alternative to, using sample values of a reference block to determine the gradient across the object edge as described above, any of the auxiliary data, or a combination thereof, may be used to calculate a gradient across an object edge.

Figure 6:
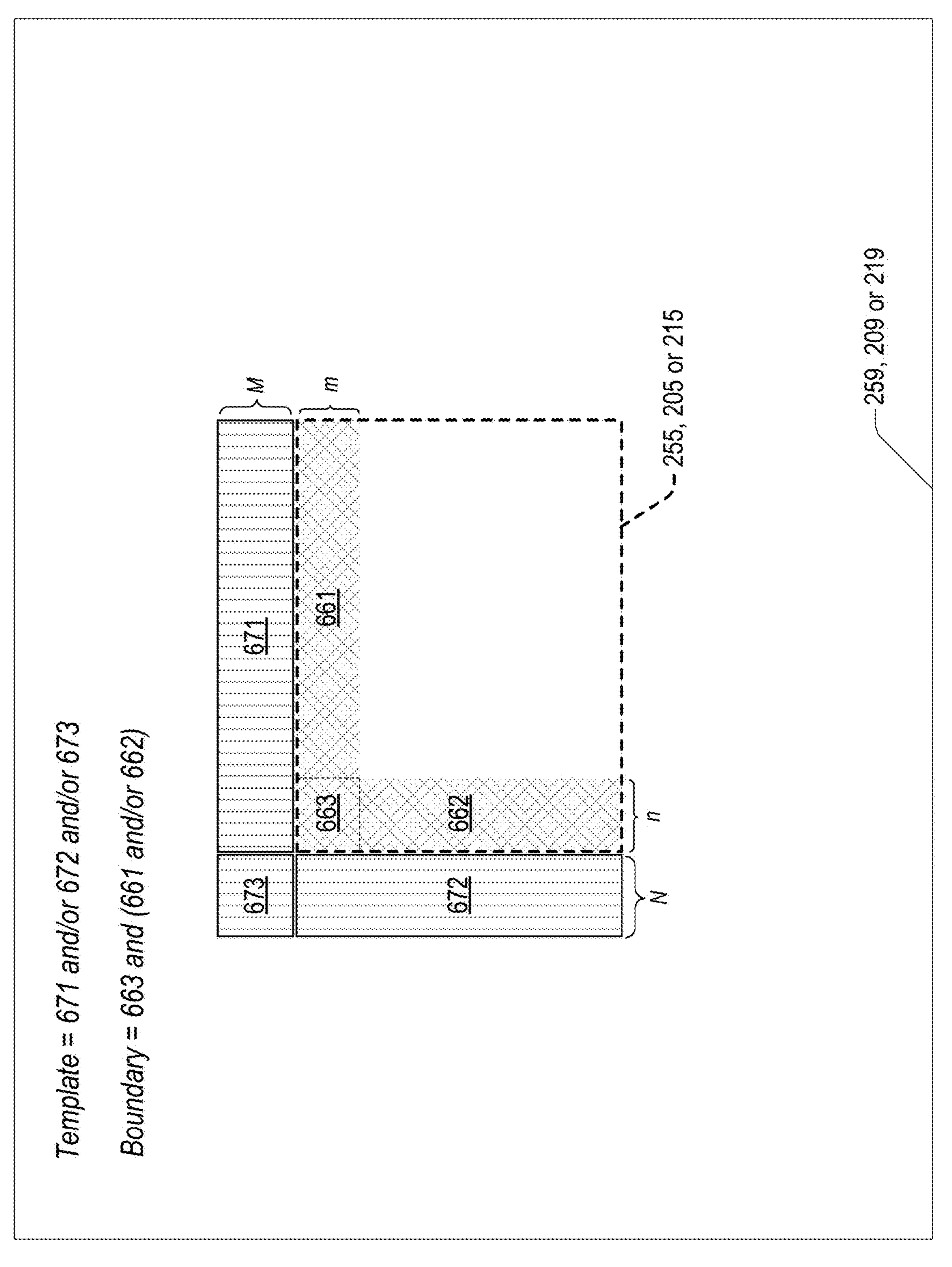
FIG. 6 is a diagram of an example design in accordance with an implementation of the present disclosure.

In some embodiments, the auxiliary data may further include template samples of the current CU as well as template samples of the two merge candidates (e.g., template sample values of the blocks 255, 205 and 215). A template of a block refers to a region, often having an L-shape, that is adjacent to the block that contains a few rows and/or columns of samples of neighboring block(s) that have been reconstructed with intra prediction, either with or without PDPC. In a raster scan coding pattern, a template comprises samples in the neighboring blocks immediately above and/or left to the block. FIG. 6 is a diagram of an example design in accordance with an implementation of the present disclosure, wherein a template region is illustrated for a block that is either the current block 255, the GPM reference block 205 or the GPM reference block 215. Description below regarding the template region uses the current block 255 as an example. Same definition of template region is applied to reference block 205, 255 or any other block. Different embodiments define the template region differently, often depending on the partition mode under consideration. In some embodiments, the template region of the current block 205 may include area 671, area 672, or both, whereas the area 671 represents the last M rows of reconstructed samples of the neighboring block immediately above the current block 205, and the area 672 represents the last N columns of reconstructed samples of the neighboring block immediately left to the current block 205. In some embodiments, the template region may further include samples represented by area 673, which is located in the immediate neighboring block of the current block 205 in the above-left direction. In some embodiments M may be equal to N, whereas in some other embodiments, M may not be equal to N. In some embodiments, M and/or N may be related to the size of the current block. For example, M may be a certain percentage of the height of the current block 205. Likewise, N may be a certain percentage of the width of the current block 205.

Accordingly, in step (ii-a), the gradient across the object edge for the current block may be calculated using the auxiliary data. For example, the gradient may be calculated using sample values within template 575 of the current block 255, whereas the object edge 530 may be extrapolated or otherwise extended through the vertical dimension of the templates 575. As another example, the gradient may be calculated or otherwise estimated using the difference of the indices of the reference blocks 205 and 215. The larger the index difference, the larger the gradient across the partitioning boundary 253 or the object edge 530. As yet another example, the gradient may be calculated or otherwise estimated using MVs in the current block 255, in particular, using the difference between a first group of MVs and a second group of MVs, wherein the first group comprises MVs of the current block on one side of the object edge or partitioning boundary, and the second group comprises MVs of the current block on the other side of the object edge or partitioning boundary. In some embodiments, the first group may additionally or alternatively comprise MVs of a template region of the current block on one side of the object edge, whereas the second group may additionally or alternatively comprise MVs of the template region of the current block on the other side of the object edge. In some embodiments, the first and second groups of MVs may additionally or alternatively comprise MVs of neighboring blocks. Namely, the first group may comprise MVs of the neighboring block(s) on one side of the object edge, whereas the second group may comprise MVs of the neighboring block(s) on the other side of the object edge. In some embodiments, In some embodiments, the first and second groups of MVs may comprise MV differences, i.e., the difference of the MVs between the current CU and the neighboring block(s). Namely, the first group may comprise difference of the MVs between the current CU and the neighboring block(s) on one side of the object edge, whereas the second group may comprise difference of the MVs between the current CU and the neighboring block(s) on the other side of the object edge.

It is to be noted that, for executing step (iii), different LUTs may be required to be established for different ways of calculating or estimating using sample values or auxiliary data as described above.

In one aspect, the present disclosure proposes excluding from the predefined blending width candidates one or more candidates based on any of the auxiliary data, or a combination thereof. For example, for large CU size, only the larger blending widths (e.g., θ=2, 4 and 8) are remained. Otherwise, for small CU size, the smaller blending widths (e.g., θ=½, 1 and 2) are remained.

VI. Candidate Reordering

In one aspect, the present disclosure proposes decreasing the signaling overhead by reordering candidates within a candidate set, wherein the candidates are arranged in a certain sequence or order. For example, the candidates within the candidate set can be reorder after the candidate set haven been size-reduced or not. That to say, the step of reordering the candidates in the candidate set can be performed on the original candidate set without performing the step of reducing size of the candidate set. Specifically, the video codec may perform guess-cost calculation using auxiliary data of the current block (e.g., the current CU 255), auxiliary data of the two merge candidates resulted from the selected partition mode (e.g., the merge candidates 205 and 215), or auxiliary data of a GPM prediction (e.g., the GPM prediction 257). The guess cost calculation gives an estimate or guess of the actual RD cost while being comparatively less computation intensive than the full-fledged RDO search operation. The codec may rearrange the order of the candidates according to the calculated guess cost associated with each candidate. A candidate having a lower guess cost would result in a better prediction in coding the current CU, and thus is placed to the front of the sequence. That is, the codec reorders the candidates in an ascending order of the guess cost, with a candidate having a lower guess cost arranged in front of another candidate having a higher guess cost in the sequence. Moreover, a candidate occupying a front position in the sequence is typically assigned with a signaling code word that is shorter (i.e., represented using less bits) than that of another candidate occupying a rear position in the sequence. As a result, coding gain is enhanced while signaling overhead is reduced.

Figure 7:
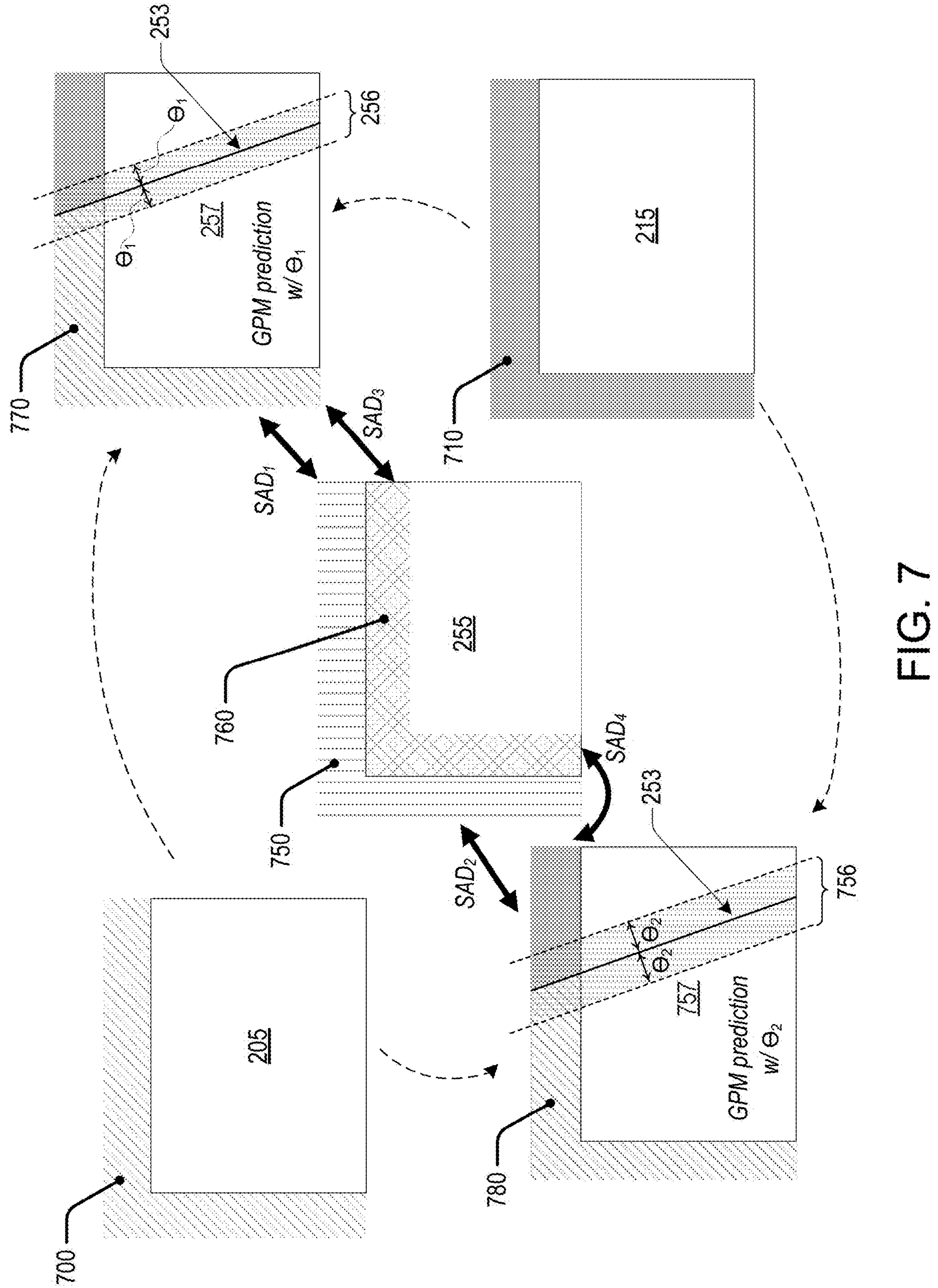
FIG. 7 is a diagram of an example design in accordance with an implementation of the present disclosure.

FIG. 7 is a diagram of an example design in accordance with an implementation of the present disclosure, wherein a template matching (TM) technique is employed for the guess cost calculation. Specifically, a template 750 of the current block 255, a template 700 of the merge candidate 205 and a template 710 of the merge candidate 215 are used by the codec for a guess cost calculation. Although shown as an L-shape region, each of the templates 700, 710 and 750 may alternatively have only one or two sections of the L-shape region, such as one or two but not all three of the areas 671, 672 and 673. For example, each of the templates 700, 710 and 750 may alternatively include only a few adjacent rows of the neighboring block immediately above the blocks 205, 215 and 255, respectively.

Also shown in FIG. 7 are the GPM prediction 257 and another GPM prediction 757. Both GPM predictions 257 and 757 of FIG. 7 represent the blending the two merge candidates 205 and 215, whereas the prediction 257 represents the blending with a blending width $\theta_1$, and the prediction 757 with a blending width $\theta_2$ different from $\theta_1$, wherein both $\theta_1$ and $\theta_2$ are candidates of the blending width candidate set. The blending regions of the two predictors are also shown as 256 and 756, respectively, in FIG. 7.

The video codec may determine which one of the predictions 257 and 757 is a better candidate for coding the current block 255 in GPM. Instead of actually generating the two predictions and performing an RD cost calculation between the current block 255 and each of the predictions 257 and 757, the codec may perform a guess cost calculation using the templates 700, 710 and 750. Specifically, a template 770 is generated by blending the templates 700 and 710 with the blending width $\theta_1$ within an area where the blending region 256 extends along the split line 253 and overlaps with the template 770. Likewise, a template 780 is generated by blending the templates 700 and 710 with the blending width $\theta_2$ within an area where a blending region 756 extends along the split line 253 and overlaps with the template 780. Similar to the blending region 256, the blending region 756 comprises a stripe centered along the split line 253, only with a width of $2*\theta_2$ instead of $2*\theta_1$. After the blended templates 770 and 780 are generated, the codec may perform a guess cost calculation using template matching between the template 750 of the current block 255 and each of the blended templates 770 and 780. For example, the codec may compare the templates 750 and 770 and designate the sample value difference between the two templates, presented in Sum of Absolute Difference (SAD) or Sum of Absolute Transformed Difference (SATD), as the guess cost of the prediction 257. Likewise, the codec may also compare the templates 750 and 780 and designate the sample value difference therebetween as the guess cost of the prediction 757. Between the predictions 257 and 757, the one having the lower guess cost is the better prediction, and the associated blending width is arranged in front of the other blending width in the blending width candidate set reordering. Referring to FIG. 7, if $SAD_1>SAD_2$, then $\theta_2$ is reordered in front of $\theta_1$ in the blending width candidate set. On the other hand, if $SAD_1<SAD_2$, then $\theta_1$ is reordered in front of $\theta_2$ in the blending width candidate set.

Also shown in FIG. 7 is a boundary matching (BM) technique that may be employed, in place of the template matching, for the guess cost calculation to determine which one of the predictions 257 and 757 is a better candidate for coding the current block 255 in GPM. Specifically, the blended templates 770 and 780 are respectively compared to a boundary region 760 of the current block 255. The boundary region 760 may comprise a few rows or columns of the current block 255 that are adjacent to the template region 750. Also referring to FIG. 6, the boundary region 760 may include two or three of areas 661, 662 and 663. Basically, the shape of the boundary region 760 should match the shape of the template region 750. That is, if the template region 750 consists of area 671, and maybe additionally of 673, then the boundary region 760 may consist of areas 661 and 663. If the template region consists of area 672, and maybe additionally of 673, then the boundary region 760 may consist of areas 662 and 663. If the template region consists of areas 671 and 672, and maybe additionally of 673, then the boundary region 760 may consist of areas 661, 662 and 663. As indicated in FIG. 6, each of the areas 661, 662 and 663 may consists of m rows and/or n columns of samples, whereas each of the areas 671, 672 and 673 may consists of M rows and/or N columns of samples. It is not required that M=m or N=n, although typically M=m and N=n for boundary matching.

After the blended templates 770 and 780 are generated as described above, the codec may perform a guess cost calculation using boundary matching between the boundary region 760 of the current block 255 and each of the blended templates 770 and 780. For example, the codec may compare the boundary region 760 and the template 770 and designate the SAD or SATD as the guess cost of the prediction 257. Likewise, the codec may also compare the boundary region 760 and the template 780 and designate sample value difference therebetween as the guess cost of the prediction 757. Between the predictions 257 and 757, the one having the lower guess cost is the better prediction, and the associated blending width is arranged in front of the other blending width in the blending width candidate set reordering. Referring to FIG. 7, if $SAD_3>SAD_4$, then $\theta_2$ is reordered in front of $\theta_1$ in the blending width candidate set. On the other hand, if $SAD_3<SAD_4$, then $\theta_1$ is reordered in front of $\theta_2$ in the blending width candidate set.

In addition to the template matching and the boundary matching techniques, other techniques may be used to estimate the guess cost for each blending width candidate and to reorder the blending width candidate set accordingly. For instance, various gradients estimated from the auxiliary data, as described elsewhere herein above for the candidate set size reduction, may be also used for candidate set reordering.

It is to be noted that the blending width candidate order is partition mode dependent. That is, the order of the blending width candidates in the candidate set may be different for different partition modes. For example, while $\theta_1$ is reordered to be in front of $\theta_2$ for certain partition mode, $\theta_1$ may be reordered to be after $\theta_2$ for another partition mode. It is also to be noted that the reordering method described above can be applied to the predefined, full-fledged blending width candidate set, as well as to the sized-down blending width candidate set which has gone through the candidate size reduction as described elsewhere herein above.

In some embodiments, the reordering of the blending width candidates may follow the size reduction of the blending width candidate set. That is, after excluding one or more unlikely blending width candidates a described above, the codec may perform the candidate reordering for blending width candidates in the sized-down candidate set.

In some embodiments, the size reduction of the blending width candidate set may follow the reordering of the blending width candidates. That is, the codec may reorder the candidates in the predefined blending width candidate set, and then perform the size reduction to exclude one or more unlikely blending width candidates as described above. In some embodiments, the candidate set size reduction may be based on the result of the candidate reordering. For example, in preforming the candidate set size reduction, the codec may keep the first N candidates in the reordered candidate set and exclude the rest of the candidates. In some embodiments, N may be equal to one; namely, only the first candidate in the reordered blending width candidate set is kept, with which the current CU is GPM-coded.

The concept of candidate reordering may not be limited only to the blending width candidate set. Rather, the same concept may be applied to another candidate set for GPM. For example, the partition mode candidate set may be reordered in a similar way using TM or BM techniques. Moreover, the merge candidate set may also be reordered similarly.

In one aspect, the present disclosure proposes constructing a GPM candidate set by combining the partition mode candidate set and the merge candidate set. Subsequently, a guess cost calculation as described above may be performed across the candidates in the GPM candidate set to reorder the GPM candidate set. The GPM candidate having the lowest guess cost is used for coding the current CU in GPM. Namely, the partition mode-merge candidate pair combination indicated by the GPM candidate having the lowest guess cost is used to code the current CU.

Specifically, each candidate in the GPM candidate set represents a possible combination of a partition mode and a pair of merge candidates each for one of the two GPM parts. For instance, the partition mode candidate set may have 64 different partition mode candidates, and the merge candidate set may have 6 different merge candidates. This results in a GPM candidate set that has as many as 64*P(6,2)=64*6*(6-1)=1920 GPM candidates. The codec may subsequently calculate a guess cost for each of the 1920 GPM candidates and reorder them accordingly. In some embodiments, a size reduction may be performed to downsize the GPM candidate set to a number smaller than 1920 by excluding some unlikely candidates in a way similar to how the blending width candidate set can be downsized as described elsewhere herein above. The first candidate in the GPM candidate set after the reordering indicates a combination of a partition mode and a pair of merge candidates that collectively gives the lowest guess cost. That combination is the one with which codec is to code the current CU in GPM.

For one or more candidates in the GPM candidate set after the reordering, the blending width candidates in the reduced blending width candidates wet can be reordered to save signaling bit. For example, for the first candidate in the GPM candidate set after the GPM candidate set reordering, the horizontal and/or vertical gradients are used to reorder the blending weight candidates in blending weight candidate blending width candidate set as mentions above. That is, at most 6×5 (merge candidate pairs)*64 (partition modes)*k (blending weights) candidates are reordered together. The best N GPM candidates (i.e., N sets of merge candidate pairs, partition modes and blending weights) are kept. An index is determined by the RD cost explicitly to indicate the best GPM candidate among the best N GPM candidates and signaled to the decoder. Or an index is determined implicitly by selecting the index of the GPM candidate with smallest template matching cost without signaling.

VII. Illustrative Implementations

Figure 8:
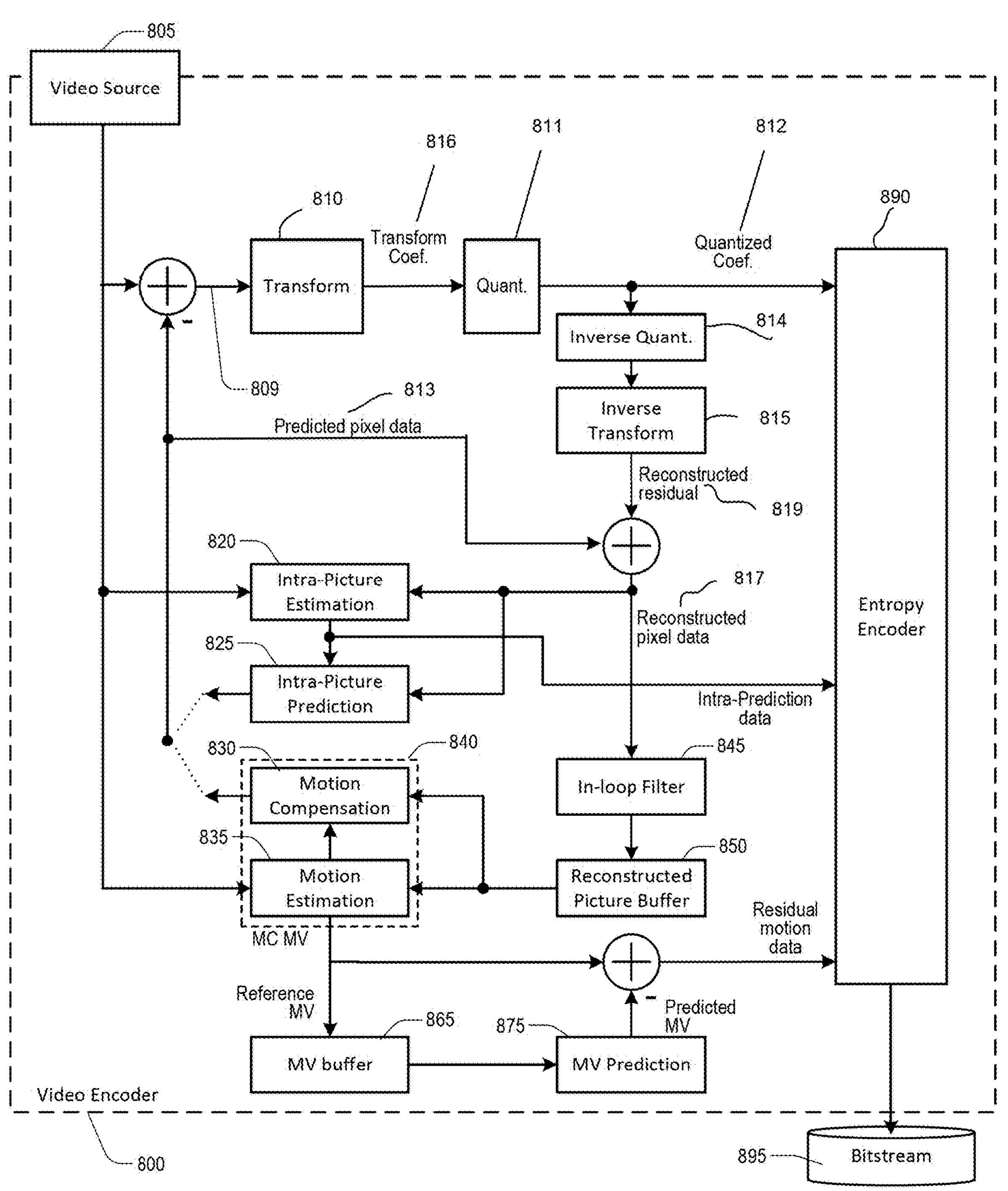
FIG. 8 is a diagram of an example video encoder in accordance with an implementation of the present disclosure.

FIG. 8 illustrates an example video encoder 800, wherein the various embodiments and schemes described elsewhere herein above may be adopted or otherwise realized. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, a MV prediction module 875, and an entropy encoder 890. The motion compensation module 830 and the motion estimation module 835 are part of an inter-prediction module 840. The inter-prediction module 840 may include an integer motion estimation (IME) kernel which is configured to perform integer pixel search, as well as a fractional motion estimation (FME) kernel which is configured to perform fractional pixel search. Both the integer pixel search and the fractional pixel search are essential functions for the motion compensation module 830 and the motion estimation module 835.

In some embodiments, the modules 810-890 as listed above are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. That is, the video source 805 provides pictures or frames presented in a temporal sequence. A subtractor 808 computes the difference between the video data from the video source 805 and the predicted pixel data 813 from the motion compensation module 830 or intra-prediction module 825. The transform module 810 converts the difference (or the residual pixel data or residual signal) 809 into transform coefficients 816 (e.g., by performing Discrete Cosine Transform, or DCT). The quantization module 811 quantizes the transform coefficients 816 into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
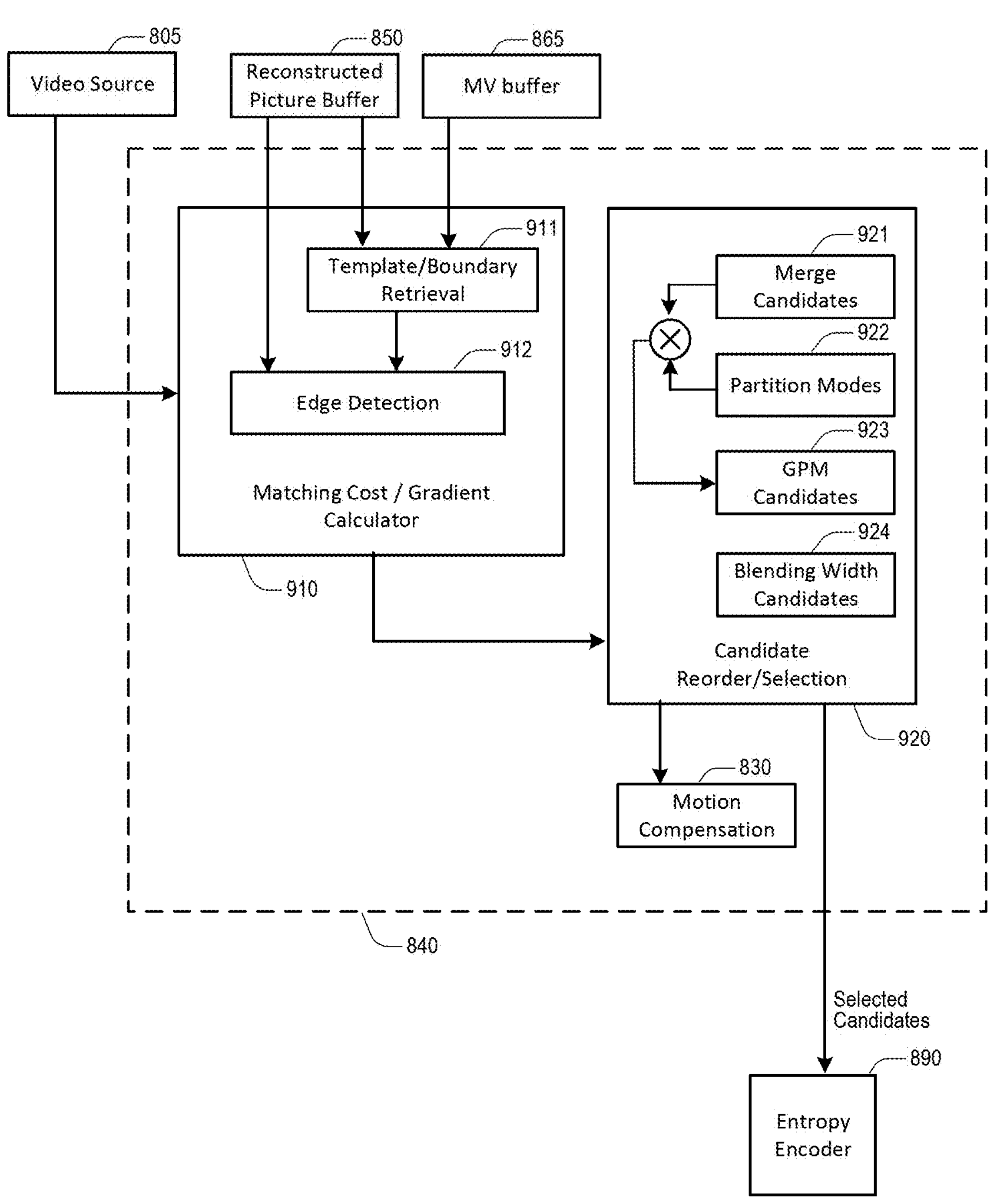
FIG. 9 is a diagram of a part of the example video encoder of FIG. 8.

FIG. 9 illustrates portions of the video encoder 800 that implement efficient GPM coding with candidate set reordering and size reduction proposed in the present disclosure. Specifically, the figure illustrates some components of the inter-prediction module 840 of the video encoder 800 that calculate various guess costs, gradient values and RD costs, as well as maintain and manage various candidate sets. The inter-prediction module 840 may include a calculator 910 for calculating matching costs (e.g., guess costs $SAD_1$-$SAD_4$ in FIG. 7) and gradients (e.g., gradients 511, 512 and 517). The calculator 910 includes an edge detection module 912 for detecting object edges (e.g., object edges 510, 520 and 530) using sample values or auxiliary data, with the sample values provided by the reconstructed picture buffer (RPB) 850 and/or directly from the video source 805, and the auxiliary data provided by a template/boundary retriever 911 that is capable of retrieving template regions (e.g., the regions 700, 710 and 750) and boundary regions (e.g., the region 760) based on reference or neighboring blocks from the RPB 850 and MVs from the MV buffer 865.

The inter-prediction module 840 may include a candidate manager 920 for managing various candidate sets, which include a merge candidate set 921, a partition mode candidate set 922 and a blending width candidate set 924. The candidate manager 920 is also capable of generating a GPM candidate set 923 based on candidates in the merge candidate set 921 and partition mode candidate set 922. Each candidate in the GPM candidate set 923 represents a respective combination of a merge candidate of the merge candidate set 921 and a partition mode of the partition mode candidate set 922. The candidate manager 920 may reorder candidates in any of the candidate sets 921-924, as well as excluding certain candidates from any of the candidate sets 921-924, based on the calculated gradients and/or guess costs provided by the calculator 910. The candidate manager 920 may also assign code words to indices of the candidates in any of the candidate sets 921-924, whether the respective candidate set is before or after a size reduction or reordering. In some embodiments, the candidate manager 920 may send indices of selected or remaining candidate(s) to the entropy encoder 890 for signaling to the decoder. Also, the candidate manager 920 may send indices of the selected candidates to the motion compensation module 830 for encoding the current block in GPM.

In some embodiments, an encoder may signal (or generate) one or more syntax elements in a bitstream, such that a decoder may parse said one or more syntax element from the bitstream.

Figure 10:
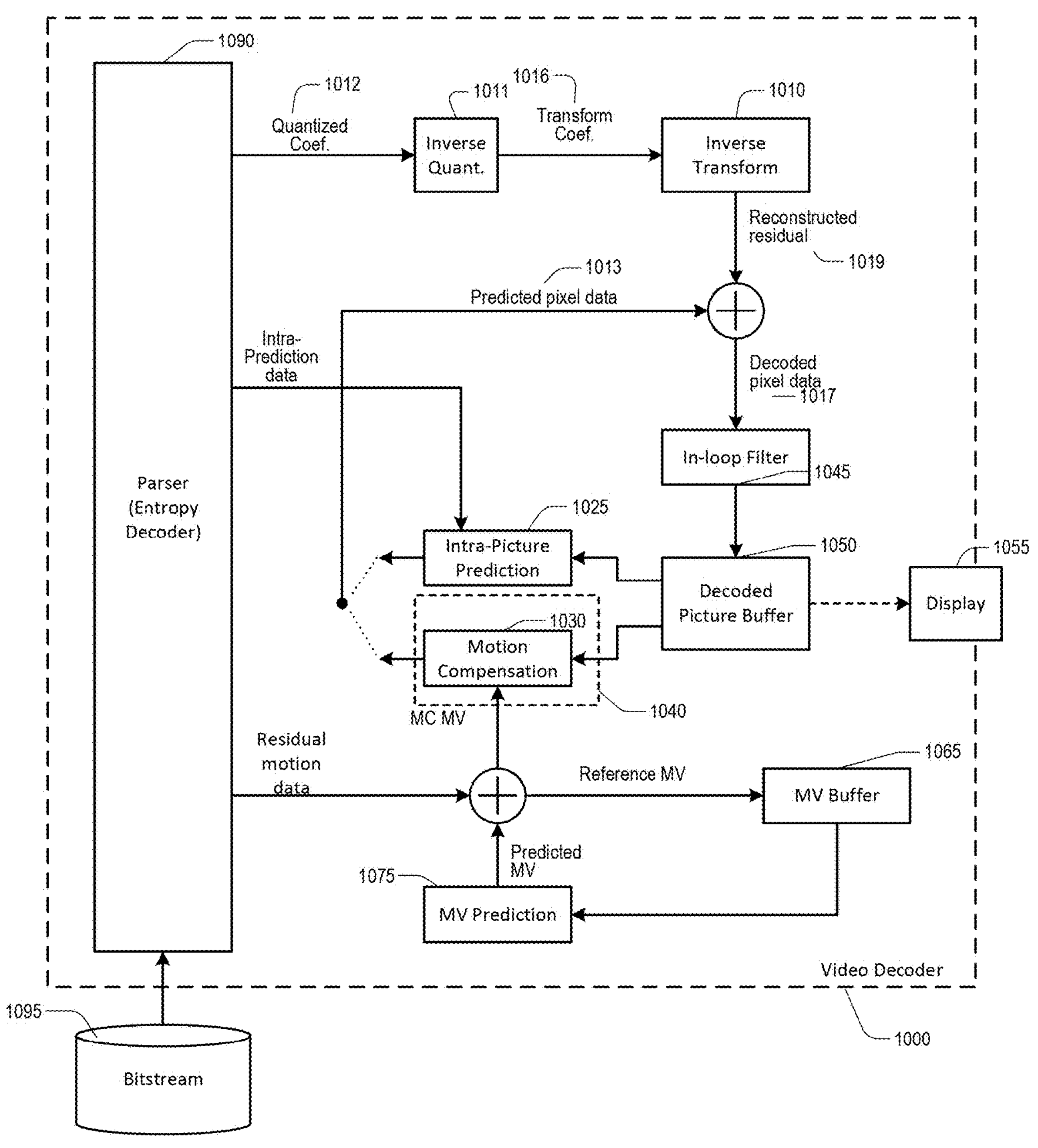
FIG. 10 is a diagram of an example video decoder in accordance with an implementation of the present disclosure.

FIG. 10 illustrates an example video decoder 1000, wherein the various embodiments and schemes described elsewhere herein above may be adopted or otherwise realized. As illustrated, the video decoder 1000 is an image-decoding or video-decoding circuit that receives a bitstream 1095 and decodes the content of the bitstream 1095 into pixel data of video frames for display. The video decoder 1000 has several components or modules for decoding the bitstream 1095, including some components selected from an inverse quantization module 1011, an inverse transform module 1010, an intra-prediction module 1025, a motion compensation module 1030, an in-loop filter 1045, a decoded picture buffer 1050, a MV buffer 1065, a MV prediction module 1075, and a parser 1090. The motion compensation module 1030 is part of an inter-prediction module 1040.

In some embodiments, the modules 1010-1090 are modules of software instructions being executed by one or more processing units (e.g., a processor) of a computing device. In some embodiments, the modules 1010-1090 are modules of hardware circuits implemented by one or more integrated circuits (ICs) of an electronic apparatus. Though the modules 1010-1090 are illustrated as being separate modules, some of the modules can be combined into a single module.

The parser (e.g., an entropy decoder) 1090 receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman coding.

The inverse quantization module 1011 de-quantizes the quantized data (or quantized coefficients) 1012 to obtain transform coefficients 1016, and the inverse transform module 1010 performs inverse transform on the transform coefficients 1016 to produce reconstructed residual signal 1019. The reconstructed residual signal 1019 is added with predicted pixel data 1013 from the intra-prediction module 1025 or the motion compensation module 1030 to produce decoded pixel data 1017. The decoded pixels data 1017 are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly or retrieves the content of the decoded picture buffer to a display buffer. In some embodiments, the display device receives pixel values from the decoded picture buffer 1050 through a pixel transport.

The motion compensation module 1030 produces predicted pixel data 1013 from the decoded pixel data 1017 stored in the decoded picture buffer 1050 according to motion compensation MVs (MC MVs). These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
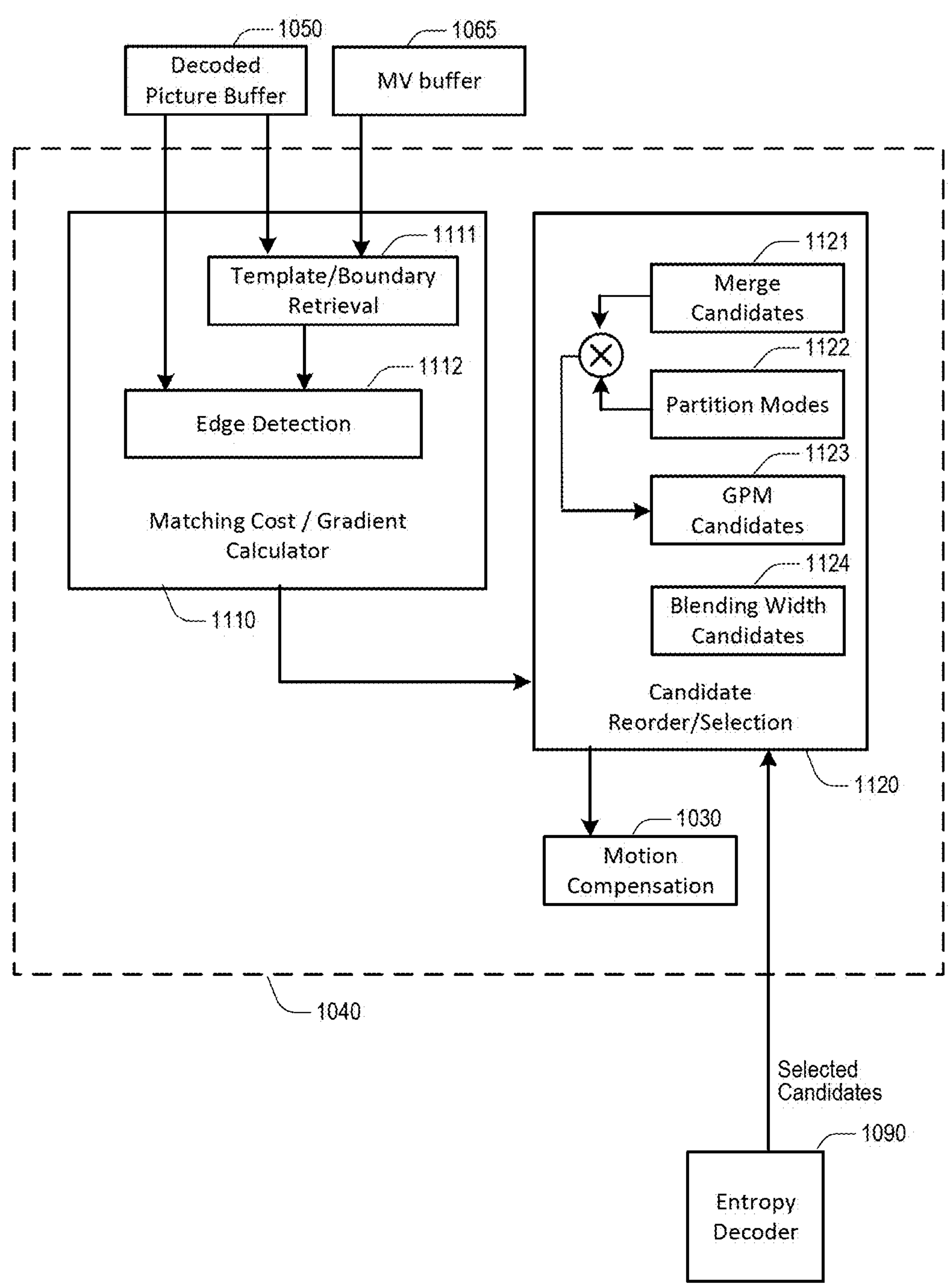
FIG. 11 is a diagram of a part of the example video decoder of FIG. 10.

FIG. 11 illustrates portions of the video decoder 1000 that implement efficient GPM coding with candidate set reordering and size reduction proposed in the present disclosure. Specifically, the figure illustrates some components of the inter-prediction module 1040 of the video decoder 1000 that calculate various guess costs, gradient values and RD costs, as well as maintain and manage various candidate sets. The inter-prediction module 1040 may include a calculator 1110 for calculating matching costs (e.g., guess costs $SAD_1$-$SAD_4$ in FIG. 7) and gradients (e.g., gradients 511, 512 and 517). The calculator 1110 includes an edge detection module 1112 for detecting object edges (e.g., object edges 510, 520 and 530) using sample values or auxiliary data, with the sample values provided by the decoded picture buffer (DPB) 1050, and the auxiliary data provided by a template/boundary retriever 1111 that is capable of retrieving template regions (e.g., the regions 700, 710 and 750) and boundary regions (e.g., the region 760) based on reference or neighboring blocks from the DPB 1050 and MVs from the MV buffer 1065. In some embodiments, the calculator 1110 may be identical to the calculator 910.

The inter-prediction module 1040 may include a candidate manager 1120 for managing various candidate sets, which include a merge candidate set 1121, a partition mode candidate set 1122 and a blending width candidate set 1124. The candidate manager 1120 is also capable of generating a GPM candidate set 1123 based on candidates in the merge candidate set 1121 and partition mode candidate set 1122. Each candidate in the GPM candidate set 1123 represents a respective combination of a merge candidate of the merge candidate set 1121 and a partition mode of the partition mode candidate set 1122. The candidate manager 1120 may reorder candidates in any of the candidate sets 1121-1124, as well as reducing a size of a blending width candidate set 1124 by excluding certain candidates from any of the candidate sets 1121-1124, based on the calculated gradients and/or guess costs provided by the calculator 1110. The candidate manager 1120 may also assign code words to indices of the candidates in any of the candidate sets 1121-1124, whether the respective candidate set is before or after a size reduction or reordering. In some embodiments, the candidate manager 1120 may receive indices of selected or remaining candidate(s) from the entropy decoder 1090, which are signaled from the encoder 800. Also, the candidate manager 1120 may send indices of the selected candidates to the motion compensation module 1030 for decoding the current block in GPM. In some embodiments, the candidate manager 1120 may be identical to the candidate manager 920. Therefore, the size and the order of the candidate sets 1121-1124 may remain in sync with the size and the order of the candidate sets 921-924, respectively.

VIII. Illustrative Process

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to realizing an efficient GPM coding process in accordance with the present disclosure. Process 1200 may include one or more operations, actions, or functions as illustrated by one or more of blocks 1210, 1220, 1230, 1240, 1250 and 1260. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in the apparatus 800 or 1000 as well as any variations thereof. Solely for illustrative purposes and without limiting the scope, process 1200 are described below in the context of the apparatus 800 or 1000. Process 1200 may begin at block 1210.

At 1210, process 1200 may involve inter-prediction module 840 or 1040 receiving pixel data of a current block. For example, the inter-prediction module 840 may receive pixel data of the block 255 from the video source 805 or the RPB 850. Likewise, the inter-prediction module 1040 may receive pixel data of the block 255 from the DPB 1050. Process 1200 may proceed from 1210 to 1220.

At 1220, process 1200 may involve the candidate manager 920 or 1120 selecting a partition mode (e.g., the partition mode defined by the split line 253) from a partition mode candidate set (e.g., the partition mode candidate set 922 or 1122). The partition mode candidate set may include one or more partition mode candidates. Each partition mode candidate in the partition mode candidate set is defined by a respective partitioning boundary within the current block (e.g., the split line 253 or any of the split lines shown in diagram 320). For the encoder 800, the candidate manager 920 may select the partition mode by performing an RDO search within the partition mode candidate set 922. For the decoder 1000, the candidate manager 1120 may select the partition mode based on a partition mode index signaled from the encoder 800. The entropy decoder 1090 may parse the bitstream 1095 to obtain the signaled partition mode index and provide the index to the candidate manager 1120 for making the selection. Process 1200 may proceed from 1220 to 1230.

At 1230, process 1200 may involve the candidate manager 920 or 1120 determining two merge candidates of the current block, wherein each of the two merge candidates corresponds to a respective GPM part of the current block determined by the selected partition mode. For example, the partition mode represented by the split line 253 divides the current block 255 into two GPM parts 250 and 251. For the encoder 800, the candidate manager 920 may determine the two merge candidates 205 and 215 by preforming a unidirectional MCP for each of the GPM parts 250 and 251. For the decoder 1000, the candidate manager 1120 may determine the two merge candidates 205 and 215 by receiving indices of the merge candidates 205 and 215, whereas the indices are signaled from the encoder 800. The entropy decoder 1090 may parse the bitstream 1095 to obtain the signaled merge candidate indices and provide the indices to the candidate manager 1120 for determining the two merge candidates. Process 1200 may proceed from 1230 to 1235.

At 1235, process 1200 may involve the candidate manager 920 or 1120 determining a blending width candidate from a blending width candidate set based on the auxiliary data of the two merge candidates 205 and 215 or of the current block 255. The auxiliary data may be MVs of the current block 255 or MVs of one or more neighboring blocks to the current block. The auxiliary data could also be sample values of the two GPM parts 250 and 251, or indices of the two merge candidates 205 and 215. The step of 1235 may further include sub-steps 1240 and 1250.

At 1240, process 1200 may involve the candidate manager 920 or 1120 reducing a size of a blending width candidate set by excluding one or more blending width candidates from a blending width candidate set (e.g., 924 or 1124) or reordering the blending width candidate set, whereas the candidate set has two or more blending width candidates. For example, the candidate manager 920 or 1120 may exclude candidate(s) based on the selected partition mode 253 and auxiliary data of the two merge candidates 205 and 215 or of the current block 255. The auxiliary data may be MVs of the current block 255 or MVs of one or more neighboring blocks to the current block. The auxiliary data could also be sample values of the two GPM parts 250 and 251, or indices of the two merge candidates 205 and 215. In some embodiments, the auxiliary data may be sample values of a template region of the current block (e.g., the template region 750), or sample values of a template region of any of the two merge candidates (e.g., the template region 700 or 710). The template region may be determined by the template retriever 911 or 1111. The candidate manager 920 or 1120 may exclude one or more unlikely blending width candidates based on a gradient across an object edge of the current block. The object edge (e.g., the edge 530) is detected by the edge detection module 912 or 1112, whereas the gradient is calculated by the calculator 910 or 1110. The Process 1200 may proceed from 1240 to 1250.

At 1250, process 1200 may involve the candidate manager 920 or 1120 selecting a blending width from the blending width candidate set 924 or 1124. For the encoder 800, the candidate manager 920 may select the blending width by performing an RDO search within the blending width candidate set. Alternatively, the candidate manager 920 may select the blending width by performing or a guess cost calculation for each candidate in the blending width candidate set. For the decoder 1000, the candidate manager 1120 may select the blending width by receiving an index of the selected blending width candidate, whereas the index is signaled from the encoder 800. The entropy decoder 1090 may parse the bitstream 1095 to obtain the signaled index of the selected blending width and provide the index to the candidate manager 1120 for selecting the blending width. For the decoder 1000, the candidate manager 1120 may also implicitly select the blending width according to the auxiliary data without signaling. The selecting of the blending width comprises designating the only one blending width candidate as the selected blending width. The Process 1200 may proceed from 1250 to 1260.

At 1260, process 1200 may involve the motion compensation module 830 or 1130 encoding or decoding the current block using the selected partition mode, the two merge candidates and the selected blending width. For the encoder 800, the motion compensation module 830 may encode the current block 255 using the selected partition mode 253, the two merge candidates 205 and 215, and the selected blending width $\theta_1$. For the decoder 1000, the motion compensation module 1030 may decode the current block 255 using the selected partition mode 253, the two merge candidates 205 and 215, and the selected blending width $\theta_1$.

IX. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
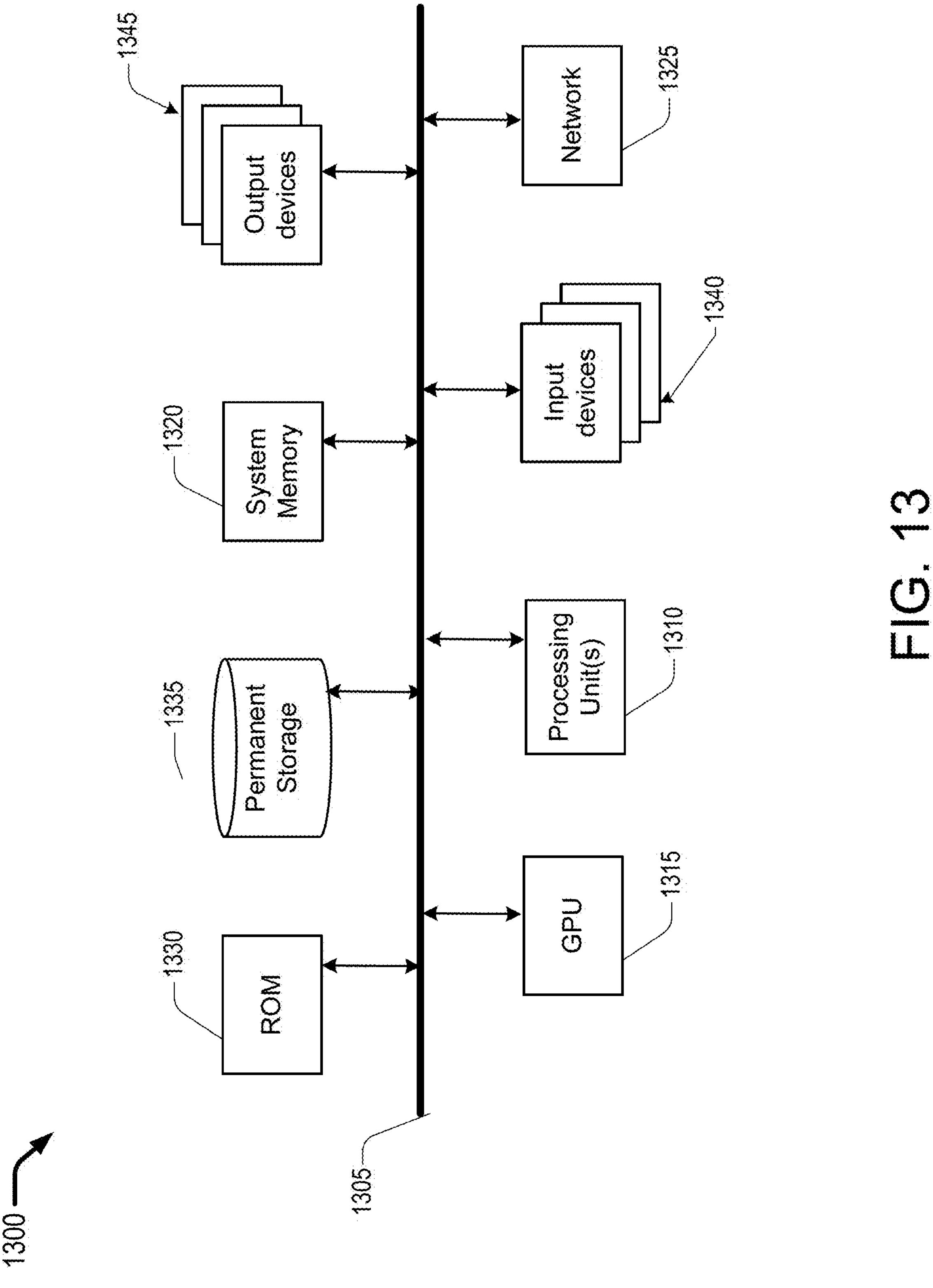
FIG. 13 is a diagram of an example electronic system in accordance with an implementation of the present disclosure.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are used by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor uses at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method applicable to an encoder or a decoder, comprising:

receiving pixel data to be encoded or decoded as a current block of a current picture of a video;

selecting a partition mode from a partition mode candidate set comprising one or more partition mode candidates each defined by a respective partitioning boundary within the current block;

determining two merge candidates of the current block, each of the two merge candidates corresponding to a respective geometric partitioning mode (GPM) part of the current block determined by the selected partition mode;

determining a blending width from a blending width candidate set based on the selected partition mode and auxiliary data of the two merge candidates or of the current block;

wherein the determining of the blending width from the blending width candidate set further comprises:

excluding and/or reordering, based on the selected partition mode and auxiliary data of the two merge candidates or of the current block, the blending width candidate set;

selecting the blending width from the blending width candidate after the excluding or reordering step; and encoding or decoding the current block using the selected partition mode, the two merge candidates and the selected blending width.

2. The method of claim 1, wherein the auxiliary data of the two merge candidates or of the current block comprises:

motion vectors (MVs) of the current block;

MVs of one or more neighboring blocks to the current block;

sample values of the two GPM parts;

reference indices of the two merge candidates;

sample values of a template region of the current block;

sample values of a template region of each of the two merge candidates; or a combination of two or more of the above.

3. The method of claim 1, wherein the excluding of the one or more blending width candidates comprises:

determining, based on the auxiliary data of the two merge candidates, a respective object edge within each of the two merge candidates;

calculating, based on the auxiliary data of the two merge candidates, a respective gradient of each of the two merge candidates across the respective object edge;

calculating, based on the gradients of the two merge candidates, a gradient of the current block; and excluding, based on the gradient of the current block, the one or more blending width candidates.

4. The method of claim 1, wherein the excluding of the one or more blending width candidates comprises:

determining, based on the selected partition mode or the auxiliary data of the current block, an object edge within the current block;

calculating, based on the auxiliary data of the current block, a gradient of the current block across the object edge; and excluding, based on the gradient of the current block, the one or more blending width candidates.

5. The method of claim 4, wherein the excluding of the one or more blending width candidates is further based on a history-based statistical model or a look-up table (LUT).

6. The method of claim 1, wherein the reordering of the blending width candidate set comprises calculating, for each blending width candidate that remains in the blending width candidate set, a respective guess cost of an associated GPM prediction.

7. The method of claim 6, wherein the calculating of the respective guess cost comprises template matching (TM) or boundary matching (BM).

8. The method of claim 1 applicable to the encoder, wherein:

the selecting of the partition mode comprises performing a rate-distortion optimization (RDO) search within the partition mode candidate set, the determining of each of the two merge candidates comprises performing a unidirectional motion compensation prediction (MCP) for the respective GPM part of the current block, and the selecting of the blending width comprises performing, after the excluding, an RDO search within the blending width candidate set or a guess cost calculation for each candidate in the blending width candidate set, or the selecting of the blending width is performing based on the auxiliary data of the current block or of the two merge candidates of the current block.

9. The method of claim 1 applicable to the encoder, further comprising:

signaling to the decoder indices indicating the two merge candidates, an index indicating the selected partition mode and an index indicating the determined blending width.

10. The method of claim 1 applicable to the encoder, further comprising:

signaling to the decoder indices indicating the two merge candidates and an index indicating the selected partition mode without signaling an index indicating the determined blending width.

11. The method of claim 1 applicable to the decoder, wherein:

the selecting of the partition mode comprises receiving from the encoder an index indicating the selected partition mode, the determining of each of the two merge candidates comprises receiving from the encoder a respective index indicating one of the two merge candidates, and the determining of the blending width comprises receiving from the encoder an index indicating the determined blending width.

12. The method of claim 1 applicable to the decoder, wherein:

the selecting of the partition mode comprises receiving from the encoder an index indicating the selected partition mode, the determining of each of the two merge candidates comprises receiving from the encoder a respective index indicating one of the two merge candidates, the blending width candidate set comprises only one blending width candidate after the excluding, and the selecting of the blending width comprises designating the only one blending width candidate as the selected blending width.

13. The method of claim 1, the partition mode candidate set comprising a first number of the partition mode candidates, the method further comprising:

constructing, based on the partition mode candidate set and a merge candidate set comprising a second number of merge candidates, a GPM candidate set comprising a third number of GPM candidates each representing a respective combination of one of the partition mode candidates and two of the merge candidates; and reordering the GPM candidate set by calculating a respective guess cost for each of the GPM candidates, wherein the selecting of the partition mode and the determining of the two merge candidates comprise selecting or determining the partition mode and the two merge candidates that are indicated by one of the GPM candidates that has a lowest guess cost.

14. The method of claim 13, wherein the calculating of the respective guess cost comprises template matching (TM) or boundary matching (BM).

15. The method of claim 13, further comprising:

for one or more candidates in the GPM candidate set after reordering, reordering, based on the auxiliary data of the two merge candidates or of the current block, the blending width candidate set.

16. An electronic apparatus comprising:

a video coding circuit configured to perform operations comprising:

receiving pixel data to be encoded or decoded as a current block of a current picture of a video;

selecting a partition mode from a partition mode candidate set comprising one or more partition mode candidates each defined by a respective partitioning boundary within the current block;

determining two merge candidates of the current block, each of the two merge candidates corresponding to a respective geometric partitioning mode (GPM) part of the current block determined by the selected partition mode;

determining a blending width from a blending width candidate set based on the selected partition mode and auxiliary data of the two merge candidates or of the current block;

wherein the determining of the blending width from the blending width candidate set further comprises:

excluding and/or reordering, based on the selected partition mode and auxiliary data of the two merge candidates or of the current block, the blending width candidate set;

selecting the blending width from the blending width candidate after the excluding or reordering step; and encoding or decoding the current block using the selected partition mode, the two merge candidates and the selected blending width.

17. The apparatus of claim 16, wherein the operations of determining the blending width further comprise:

constructing, based on the partition mode candidate set and a merge candidate set comprising one or more merge candidates, a GPM candidate set comprising two or more GPM candidates each representing a respective combination of one of the partition mode candidates and one of the merge candidates; and reordering the GPM candidate set by calculating a respective guess cost for each of the GPM candidates;

wherein the selecting of the partition mode and the determining of the two merge candidates comprise selecting or determining the partition mode and the two merge candidates that are indicated by one of the GPM candidates that has a lowest guess cost.

* * * * *